(12) United States Patent
Wu et al.

(10) Patent No.: US 9,535,569 B2
(45) Date of Patent: Jan. 3, 2017

(54) SYSTEM AND METHOD FOR A HOME MULTIMEDIA CONTAINER

(71) Applicant: Rakuten Kobo Inc., Toronto (CA)

(72) Inventors: James Wu, Newmarket (CA); Robin Bennett, Beeton (CA); Daniel Hill, Toronto (CA); Anya Galkina, Toronto (CA)

(73) Assignee: RAKUTEN KOBO, INC., Toronto (CA)

(*) Notice: Subject to any disclaimer, the term of this patent is extended or adjusted under 35 U.S.C. 154(b) by 184 days.

(21) Appl. No.: 13/901,498

(22) Filed: May 23, 2013

(65) Prior Publication Data

US 2014/0351752 A1    Nov. 27, 2014

(51) Int. Cl.
  *G06F 3/0481* (2013.01)
  *G06F 17/30* (2006.01)
  *G06F 3/0482* (2013.01)

(52) U.S. Cl.
  CPC ......... *G06F 3/04817* (2013.01); *G06F 3/0482* (2013.01); *G06F 17/30846* (2013.01)

(58) Field of Classification Search
  CPC .. G06F 3/04842; G06F 3/03817; G06F 3/048; G06F 3/0481; G06F 9/4443
  See application file for complete search history.

(56) References Cited

U.S. PATENT DOCUMENTS

| | | | | |
|---|---|---|---|---|
| 5,396,264 A * | 3/1995 | Falcone | ................. | G06F 3/0482 340/7.55 |
| 6,829,009 B2 * | 12/2004 | Sugimoto | .......... | H04N 5/23293 348/333.02 |
| 7,689,933 B1 * | 3/2010 | Parsons | ................. | G06F 3/0482 715/200 |
| 8,156,437 B2 * | 4/2012 | Karasawa | ............. | G06F 3/0486 715/201 |
| 8,564,544 B2 * | 10/2013 | Jobs | ....................... | G06F 3/0488 345/173 |
| 8,817,053 B2 * | 8/2014 | Robert | .............. | G06F 17/30126 345/660 |

(Continued)

OTHER PUBLICATIONS

Microsoft corporation; windows-7 Enterprise; Copyright 2009; Pack 1; 5 pages.*

*Primary Examiner* — Linh K Pham
(74) *Attorney, Agent, or Firm* — Oblon, McClelland, Maier & Neustadt, L.L.P.

(57) ABSTRACT

A system and method for a home multimedia container. The method includes accessing, within mobile device, a portion of an operating system corresponding to the mobile device and accessing a datastore corresponding to a home multimedia container. In one embodiment, the home multimedia container comprises a first object and a second object. The first object may be a first portion of content and the second object may be an application. The datastore may comprise information about the first object and the second object. The method further includes determining a first image based on the information about the first object and determining a second image based on an application icon corresponding to the application. The method further includes displaying the first image and the second image. In one embodiment, selection of the first image is operable to launch a first application operable to render the first portion of content.

19 Claims, 14 Drawing Sheets

700

(56) References Cited

U.S. PATENT DOCUMENTS

| | | | |
|---|---|---|---|
| 2002/0059288 A1* | 5/2002 | Yagi | G06F 3/0481 |
| 2005/0216864 A1* | 9/2005 | Dart | G06F 3/04817 |
| | | | 715/839 |
| 2007/0226652 A1* | 9/2007 | Kikuchi | G06F 3/048 |
| | | | 715/836 |
| 2007/0244908 A1* | 10/2007 | Rajan | G06F 3/0613 |
| 2008/0021921 A1* | 1/2008 | Horn | G06F 17/3002 |
| 2008/0174570 A1* | 7/2008 | Jobs | G06F 3/0488 |
| | | | 345/173 |
| 2008/0229248 A1* | 9/2008 | Fagans | G06F 17/30265 |
| | | | 715/838 |
| 2008/0307350 A1* | 12/2008 | Sabatelli | G06F 3/0481 |
| | | | 715/779 |
| 2009/0002335 A1* | 1/2009 | Chaudhri | G06F 3/04815 |
| | | | 345/173 |
| 2009/0070695 A1* | 3/2009 | Oh | G06F 3/04886 |
| | | | 715/769 |
| 2009/0222757 A1* | 9/2009 | Gupta | H04N 5/44543 |
| | | | 715/776 |
| 2009/0265660 A1* | 10/2009 | Nobori | G06F 3/0483 |
| | | | 715/788 |
| 2009/0307632 A1* | 12/2009 | Hasegawa | G06F 1/1616 |
| | | | 715/835 |
| 2010/0088645 A1* | 4/2010 | Zhang | G06F 3/0482 |
| | | | 715/838 |
| 2011/0041096 A1* | 2/2011 | Larco et al. | 715/835 |
| 2011/0055759 A1* | 3/2011 | Robert | G06F 3/04817 |
| | | | 715/825 |
| 2011/0167159 A1* | 7/2011 | Bethlehem | H04L 63/102 |
| | | | 709/226 |
| 2011/0314424 A1* | 12/2011 | Gusmorino | G06F 3/04817 |
| | | | 715/846 |
| 2012/0084689 A1* | 4/2012 | Ledet | G06F 3/0486 |
| | | | 715/769 |
| 2012/0124677 A1* | 5/2012 | Hoogerwerf | G06F 3/04883 |
| | | | 726/29 |
| 2012/0266093 A1* | 10/2012 | Park | G06F 3/0486 |
| | | | 715/769 |
| 2013/0007061 A1* | 1/2013 | Luomala | G06F 3/04883 |
| | | | 707/776 |
| 2013/0014016 A1* | 1/2013 | Delgo | G06F 17/3079 |
| | | | 715/723 |
| 2013/0151981 A1* | 6/2013 | Green | G06F 3/0484 |
| | | | 715/744 |
| 2013/0195423 A1* | 8/2013 | Barton | G06Q 30/0241 |
| | | | 386/239 |
| 2013/0332621 A1* | 12/2013 | Keller | H04L 65/60 |
| | | | 709/231 |
| 2013/0332831 A1* | 12/2013 | Birnkrant et al. | 715/719 |
| 2014/0010367 A1* | 1/2014 | Wang | H04N 21/2347 |
| | | | 380/210 |
| 2014/0033117 A1* | 1/2014 | Kim | G06F 3/04845 |
| | | | 715/796 |
| 2014/0304657 A1* | 10/2014 | Biswas | G06T 13/80 |
| | | | 715/838 |
| 2014/0365948 A1* | 12/2014 | Tanaka | G06F 3/0483 |
| | | | 715/775 |
| 2015/0067724 A1* | 3/2015 | Johnson | H04N 21/4668 |
| | | | 725/32 |

* cited by examiner

300

500

550

600

650

700

750

SYSTEM AND METHOD FOR A HOME MULTIMEDIA CONTAINER

CROSS REFERENCE TO RELATED APPLICATIONS

This application claims the benefit of and priority to the provisional patent application Ser. No. 61/697,077, entitled "SYSTEM AND METHOD OF PROVIDING A USER INTERFACE ON A MOBILE DEVICE," with filing date Sep. 5, 2012, and hereby incorporated by reference in its entirety.

This application is related to non-provisional patent application Ser. No. 13/901,363, entitled "SYSTEM AND METHOD FOR A MULTIMEDIA CONTAINER," with filing date May 23, 2013, and hereby incorporated by reference in its entirety.

This application is related to non-provisional patent application Ser. No. 13/901,429, entitled "SYSTEM AND METHOD FOR MANAGING OBJECTS IN A MULTIMEDIA CONTAINER," with filing date May 23, 2013, and hereby incorporated by reference in its entirety.

This application is related to non-provisional patent application Ser. No. 13/901,465, entitled "SYSTEM AND METHOD FOR MANAGING A MULTIMEDIA CONTAINER," with filing date May 23, 2013, and hereby incorporated by reference in its entirety.

FIELD OF THE INVENTION

Embodiments of the present invention are generally related to graphical user interfaces that may be part of a mobile operating system.

BACKGROUND

As computing technology has advanced, computers have become smaller and more portable thereby bringing about powerful handheld devices capable of performing functions of more traditional computing technology. At the same time operating systems for handheld devices or mobile devices have been developed to better suit handheld devices. Such operating systems have conventionally been focused around applications. For example, upon turning on a handheld device, the user is presented with a fixed grid of icons of representing applications that the user can choose from.

In such an application or "app centric" interface, a user's content is accessed by first accessing an application for the type of content and then selecting the desired piece of content. For example, in order for a user to access music, a music application is launched and then the desired music is selected for playback. Similarly, in order for a user to browse a website, a web browser is launched and the user enters or selects the desired website or URL (uniform resource locator). In other words, mobile operating systems are focused on or centered around applications and a user enters an application in order to access or consume content.

SUMMARY OF THE INVENTION

Accordingly, what is needed is a solution to allow a user to access content without having to first select an application in order to access the content. Embodiments of the present invention are operable to allow content and applications to be organized in a multimedia container. The multimedia container may comprise pieces of content, applications, widgets, etc. The multimedia container is displayed via a graphical user interface that allows a user to select content for access instead of selecting an application and then selecting the desired content. Embodiments of the present invention allow users to organize their content based on specific interests or life events rather than organizing their content separately within each application. Embodiments of the present invention thereby allow a user to access content without going separately to a variety of applications. Embodiments of the present invention further allow pieces of content and applications to be organized according to a common theme while being from different data types. Embodiments of the present invention thus allow a user to navigate content and applications instead of just navigating applications. Embodiments of the present invention thereby allow for a more personalized experience with a device (e.g., mobile device). Embodiments of the present invention further allow a user to organize content according to his or her interests and reorganize the content as his or her interests change.

In one embodiment, the present invention is directed to a method for displaying a portion of a graphical user interface. The method includes accessing, within mobile device, a portion of an operating system corresponding to the mobile device and accessing a datastore corresponding to a home multimedia container. In one embodiment, the home multimedia container comprises a first object and a second object. The first object may be a first portion of content and the second object may be an application. The datastore may comprise information about the first object and the second object. In one exemplary embodiment, the home multimedia container is at a top position in a hierarchy of multimedia containers. The method further includes determining a first image based on the information about the first object and determining a second image based on an application icon corresponding to the application. The method further includes displaying the first image and the second image. In one exemplary embodiment, the first image is displayed adjacent to the second image. In one embodiment the displaying is performed in response to performance of an unlock function. In one exemplary embodiment, selection of the first image is operable to launch a first application operable to render the first portion of content. In one embodiment, selection of the second image is operable to launch the application corresponding to the second image. The home multimedia container may comprise a third object, wherein the third object is a multimedia container. The home multimedia container may comprise a fourth object with the first object being of a first media type and the fourth object being of a second media type.

In one embodiment, the present invention is directed toward a computer-readable storage medium having stored thereon, computer executable instructions that, if executed by a computer system cause the computer system to perform a method for displaying a portion of a graphical user interface. The method includes accessing, within mobile device (e.g., tablet computing device), a portion of an operating system corresponding to the mobile device and accessing a datastore corresponding to a home multimedia container. In one exemplary embodiment, the home multimedia container is at a top position in a hierarchy of multimedia containers. The home multimedia container may comprise a first object and a second object. In one exemplary embodiment the first object is a first portion of content and the second object is a multimedia container. The datastore may comprise information about the first object and the second object, and the multimedia container comprises a plurality of objects. The method further includes determining a first image based on the information about the first object and determining a second image based on the plurality of objects of the multimedia container.

The method further includes displaying the first image and the second image. The displaying may be performed by the operating system. In one embodiment, the displaying is performed in response to performance of a security function of the operating system. In one exemplary embodiment, the displaying is performed as part of a startup sequence of the operating system. Selection of the first image may be operable to launch a first application operable to render the first portion of content and selection of the second image may be operable to open the multimedia container. In one embodiment, the first object is operable to be moved into the multimedia container via selection of the first image and dragging the first image over the second image. The home multimedia container may further comprise a third object, where the third object is an application and the datastore comprises information about the application. The method may further comprise determining a third image based on the information about the application and displaying the third image. Selection of the third image may be operable to launch the application.

In another embodiment, the present invention is implemented as a system operable to display a graphical user interface. The system includes an operating system. The operating system includes a datastore access module operable to access a datastore corresponding to a home multimedia container comprising a plurality of objects. A first object of the plurality of objects is operable to be a piece of content. In one embodiment, a second object of the plurality of objects is operable to be an application. The operating system further comprises an image determination module operable to generate a plurality of respective images each corresponding to respective object of the plurality of objects of the home multimedia container and a display module operable to display each respective image of the plurality of respective images. The display module may be further operable to display a portion of content adjacent to an application icon. The operating system may further include a selection module operable to receive a selection of the respective image and invoke an application corresponding to the image.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
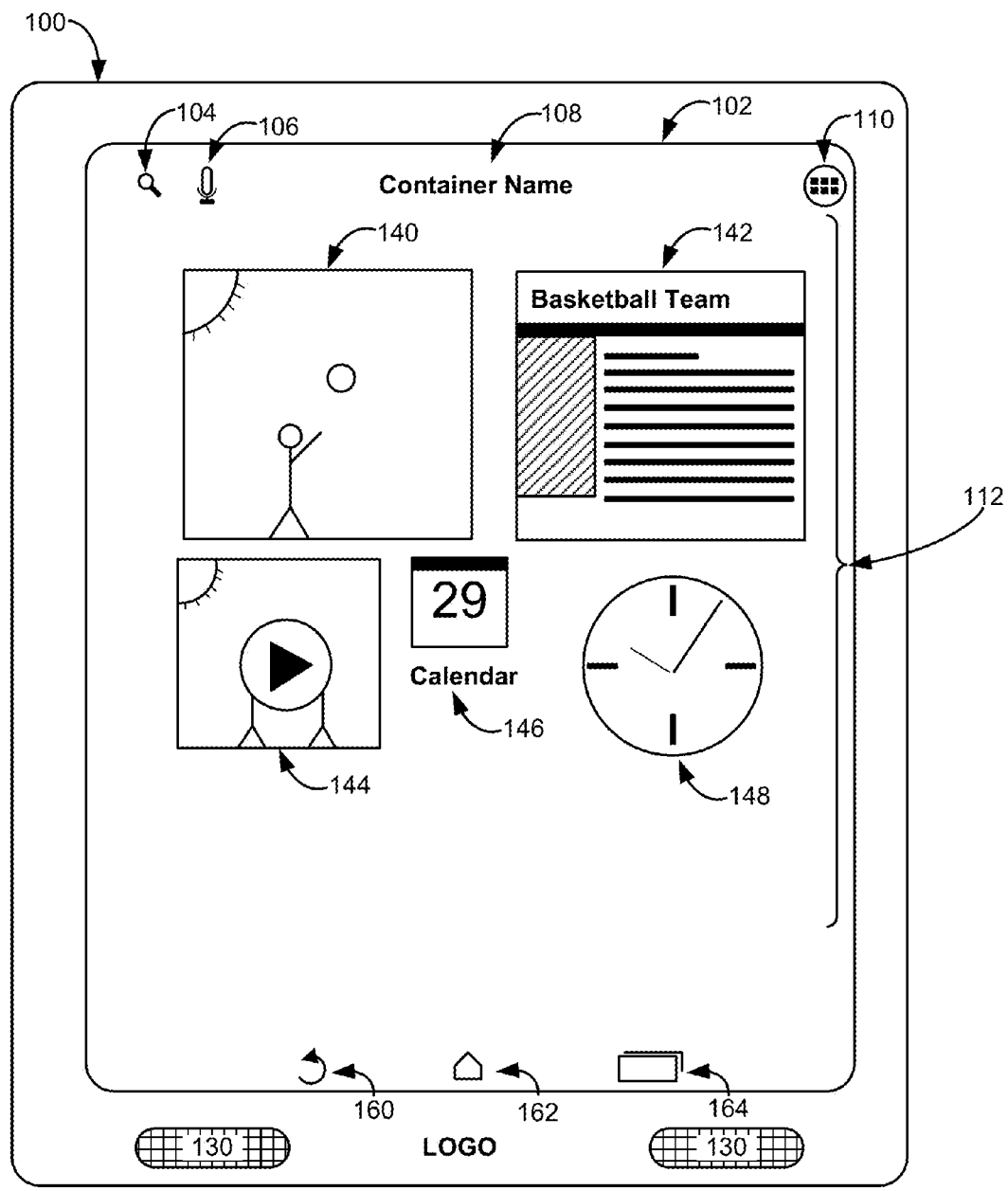
FIG. 1 shows an exemplary mobile device and an exemplary multimedia container of an exemplary graphical user interface in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of an integrated circuit (e.g., system 1400 of FIG. 14), or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Systems and Methods for a Multimedia Container

Embodiments of the present invention are operable to allow content and applications to be organized in a multimedia container. The multimedia container may comprise pieces of content, applications, widgets, etc. The multimedia container is displayed via a graphical user interface that allows users to select content for access instead of selecting an application and then selecting the desired content. Embodiments of the present invention allow a user to organize their content based on specific interests or life events rather than organizing their content separately within each application. Embodiments of the present invention thereby allow a user to access content without going separately to a variety of applications. Embodiments of the present invention further allow pieces of content and applications to be organized according to a common theme while being from different data types. Embodiments of the present invention thus allow a user to navigate content and applications instead of just navigating applications. Embodiments of the present invention thereby allow for a more personalized experience with a device (e.g., mobile device). Embodiments of the present invention further allow a user to organize content according to his or her interests and reorganize the content as his or her interests change.

Embodiments of the present invention allow a user to organize content in the context of their activities and interests. For example, a user planning a vacation may add a plurality of websites useful for planning the vacation, add a couple of books to bring on the vacation, add some songs to bring on the vacation, and add some videos for entertaining children. As another example, a user interested in cars could create a multimedia container for cars and add books about cars and Formula One drivers, add video links of videos about cars, and links to various car forums that the user participates in.

Embodiments of the present invention further allow leveraging of general human tendency to be visual. Humans can often times recognize shapes, structures, colors, or patterns faster than they can read a title. For example, it may be easier to scan across a space and identify something visually from its color, shape, or pattern of an image as well as identify where the image is located. Embodiments of the present invention thereby help users find content in a space quickly and with more context.

FIGS. 1-9, 12, and 14 illustrate example components used by various embodiments of the present invention. Although specific components are disclosed in FIGS. 1-9, 12, and 14, it should be appreciated that such components are exemplary. That is, embodiments of the present invention are well suited to having various other components or variations of the components recited in FIGS. 1-9, 12, and 14. It is appreciated that the components in FIGS. 1-9, 12, and 14 may operate with other components than those presented, and that not all of the components of FIGS. 1-9, 12, and 14 may be required to achieve the goals of embodiments of the present invention.

FIG. 1 shows an exemplary mobile device and an exemplary multimedia container of an exemplary graphical user interface in accordance with one embodiment of the present invention. FIG. 1 depicts an exemplary graphical user interface comprising an exemplary multimedia container displayed by a device (e.g., tablet computing device, mobile phone, smartphone, or the like).

In one embodiment, device 100 is a mobile computing device. Device 100 comprises speakers 130 and screen 102. In one embodiment, screen 102 is a touch sensitive (e.g., capacitive screen) operable to receive input (e.g., from a user via one or more fingers) and display a graphical user interface. Speakers 130 are operable for output of audio during rendering of content (e.g., video, video games, animations, system functions, etc.).

Device 100 is operable to render a graphical user interface comprising a multimedia container. A multimedia container is a graphically navigable container that is operable to hold various objects of various media types, applications, and widgets. In one embodiment, an exemplary implementation of a multimedia container is a tapestry available from Kobo Inc. of Toronto, Canada. Each multimedia container may comprise one or more objects which may be content, applications, widgets, etc. Multimedia containers display content in a pictorial manner thereby surfacing content for immediate consumption. In one embodiment, the multimedia containers described herein allow a user to configure the location of an object within the multimedia container (e.g., without being constrained to an automatic organization scheme). Embodiments of the present invention are operable for variable spacing between objects of a multimedia container thereby allowing a user to configure the location of the objects in a multimedia container in a customized tailored manner to the user's tastes. For example, a user may leave space between different pieces of content to visual separate pieces of content.

FIG. 1 depicts an exemplary graphical user interface rendered by device 100. The exemplary graphical user interface comprises search icon 104, voice recognition icon 106, container name 108, all applications icon 110, object area 112, and controls icon 160-164. It is noted the objects within the multimedia container described below are exemplary and embodiments of the present invention can support more or less objects.

Object area 112 comprises pieces of content, application icons, and widgets of a multimedia container. In one exemplary embodiment, object area 112 includes image 140, website image 142, video image 144, application icon 146, and widget 148. Pieces of content may be shown in pictorial form (e.g., without filenames). Embodiments of the present invention allow objects in object area 112 to be resized by a user (e.g., see FIG. 7B). Objects within object area 112 are selectable to launch a corresponding application or corresponding application for rendering content corresponding to the object in object area 112. Objects within object area 112 may be moved around (e.g., via dragging after selection via pressing and holding) or resized (e.g., via pressing and holding and manipulating a size control).

Image 140 is an image (e.g., scaled image, thumbnail, or the like) corresponding to an image that is stored on device 100. In one exemplary embodiment, image 140 is a scaled version of a child playing basketball (e.g., with a filename). Image 140 is selectable (e.g., via a touch or press) and is operable to launch an image viewing application to display an image corresponding to image 140 at full resolution. For example, a user can view image 140 at one resolution within the multimedia container and to see more detail a user can select image 140 to see the high resolution image that image 140 corresponds thereto.

Website image 142 corresponds to a rendering of a webpage (e.g., via a browser). In one exemplary embodiment, website image 142 is a scaled version of a rendering of the webpage according to a size specified corresponding to a multimedia container. In another embodiment, website image 142 is an image determined and selected from the content of the website corresponding to website image 142. Website image 142 is operable to be selected (e.g., via a touch or press) and is operable to launch a web browser to display the website corresponding to website image 142. Website image 142 and other objects within a multimedia container may be updated periodically (e.g., hourly, daily, and the like). In one embodiment, website image 142 and other objects are updated each time a user accesses the content corresponding to the object (e.g., the website corresponding to website image 142).

Video image 144 corresponds to a video (e.g., stored locally on device 100 or available over a communications network). In one embodiment, video image 144 is a scaled version (e.g., thumbnail) of a key frame of a video with an optional title. In one exemplary embodiment, video image 144 is a scaled version of a key frame of the video scaled according to a size specified corresponding to a multimedia container. Video image 144 is operable to be selected (e.g., via a touch or press) and is operable to launch a video application (e.g., for a video stored locally on device 100 or available for streaming) or launch a website with the video corresponding to video image 144.

Application icon 146 corresponds to an application and is selectable to launch the corresponding application. In one exemplary embodiment, application icon 146 corresponds to a calendar application and application icon 146 comprises an image of a calendar with the current date and text below with the name of the application.

Widget 148 is a widget and is operable to display live, auto-updating content. In one exemplary embodiment, widget 148 is a clock widget operable to display the current time. In one embodiment, widget 148 is operable to be selected (e.g., via touch or press) and upon selection launch a corresponding application (e.g., an clock application with alarm, timer, and stopwatch functionality).

Control icons 160-164 are operable for navigation of a plurality of multimedia containers and switching applications. Back control 160 is operable for navigation to a previous multimedia container. Home control 162 is operable for navigating to a home multimedia container, as described herein. Recent apps button 164 is operable to invoke a function for changing applications.

The multimedia containers of embodiments of the present invention allow a user to visually collect and organize content (e.g., books, magazines, apps, etc.). For example, a multimedia container may be created to track a user's favorite author. The user can link to the author's Twitter feed and block, keep details of upcoming tours, magazine articles, and each of the author's books.

A multimedia container may be created to organize activities. For example, a user can add applications that can alert the user about appointments and keep lists of favorite places to eat or play. A multimedia container could be created to simplify shopping. For example, the user can add applications for magazines the user follows, keep track of discount deals, mix and match online images and personal photos to help facilitate new ideas, and save links for places the user buys things.

Figure 2:
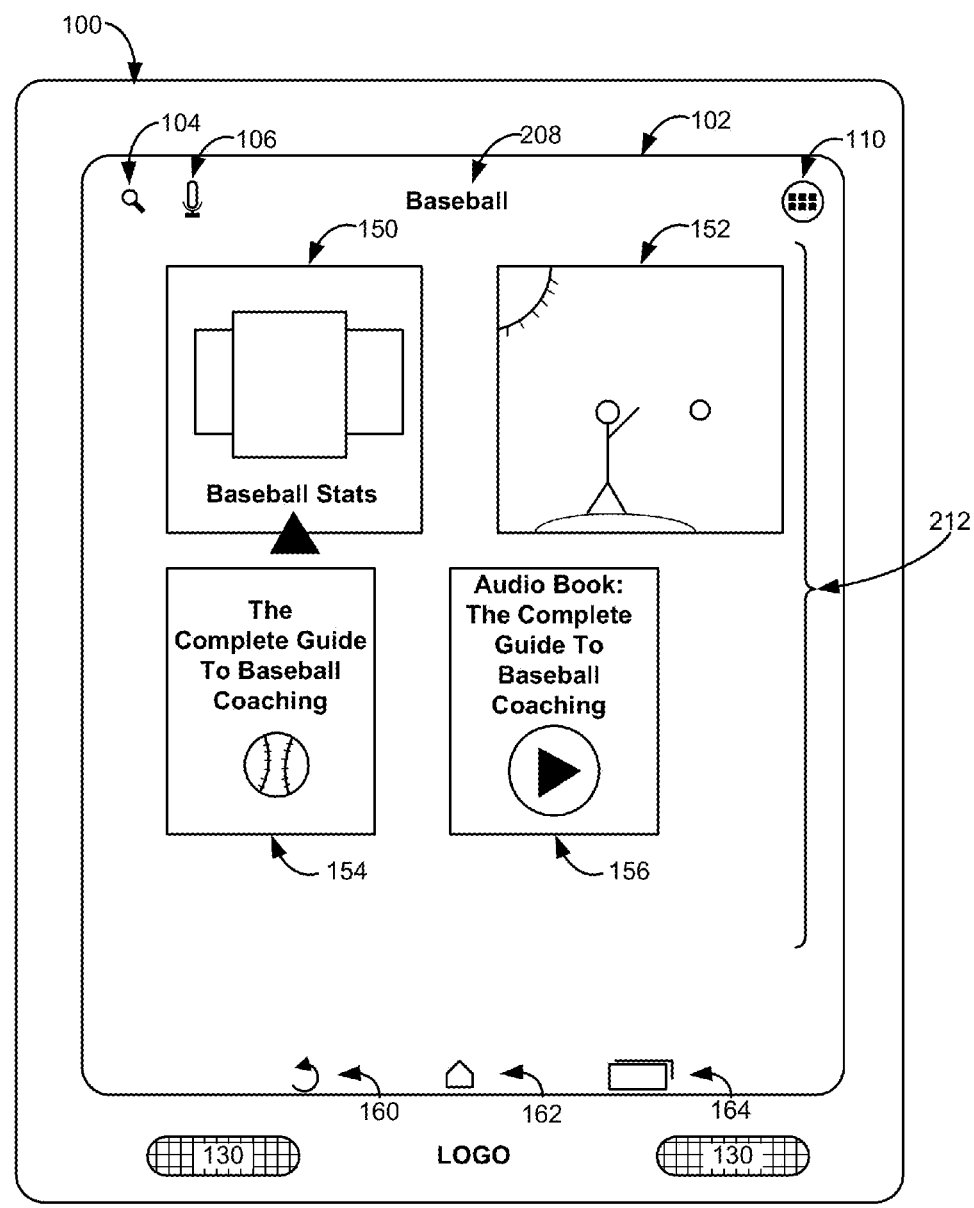
FIG. 2 shows an exemplary mobile device and another exemplary multimedia container of an exemplary graphical user interface in accordance with one embodiment of the present invention.

FIG. 2 shows an exemplary mobile device and another exemplary multimedia container of an exemplary graphical user interface in accordance with one embodiment of the present invention. Similar elements of FIG. 2 have substantially similar functions as described with respect to FIG. 1.

In one exemplary embodiment, the multimedia container of exemplary graphical user diagram 200 is a baseball multimedia container comprising objects for a parent who is coaching a baseball team. Multimedia container of graphical user interface diagram 200 has a container name 208 of baseball.

Object area 212 comprises multimedia container image 150, image 152, book image 154, and book image 156. Objects within object area 212 are selectable to launch a corresponding application or corresponding application for rendering content corresponding to the object in object area 212. Objects within object area 212 may be moved around (e.g., via dragging after selection via pressing and holding) or resized (e.g., via pressing and holding and manipulating a size control).

Multimedia container image 150 is a multimedia media container with a name of baseball stats and the corresponding multimedia container may include a variety of baseball statistic content (e.g., spreadsheets used by a coach to track a team, manuals, forms, and other content related to tracking of baseball statistics). In one embodiment, multimedia container image 150 comprises images of objects within the multimedia container corresponding to multimedia image 150. In one exemplary embodiment, multimedia container image 150 includes an outerframe and triangle (e.g., as shown in FIG. 2) to indicate to a user that multimedia container image 150 corresponds to a multimedia container and selecting (e.g., via touch or press) launches the corresponding multimedia container. Multimedia container image 150 may be selected with a press and hold and then dragged around to move multimedia container image 150.

Image 152 corresponds to an image (e.g., scaled image, thumbnail, or the like) of an image that is stored on device 100. In one exemplary embodiment, image 152 is a scaled version of a child pitching a baseball. Image 152 is selectable (e.g., via a touch or press) and is operable to launch an image viewing application to display an image corresponding to image 152 at full resolution.

Book image 154 comprises a book cover. In one exemplary embodiment, book image 154 corresponds to a book entitled "The complete guide to baseball coaching." Book image 154 is operable to be selected (e.g., via touch or press) and launch an e-book application or other application operable to render the book corresponding to book image 154.

Book image 156 comprises an audio book cover. In one exemplary embodiment, book image 156 corresponds to an audio book entitled "The complete guide to baseball coaching." Book image 156 is operable to be selected (e.g., via touch or press) and launch an audio book rendering application or other application operable to render one or more audio files corresponding to book image 156.

Embodiments of the present invention further support objects corresponding to songs and albums. In one exemplary embodiment, an object area (e.g., object area 212) corresponding to a multimedia container comprises an image of an album cover with an optional title. The image of the album cover may correspond to a song from the album or the album. The image of the album cover may be operable to be selected and upon selection launch an audio application to play the album or the song.

Figure 3:
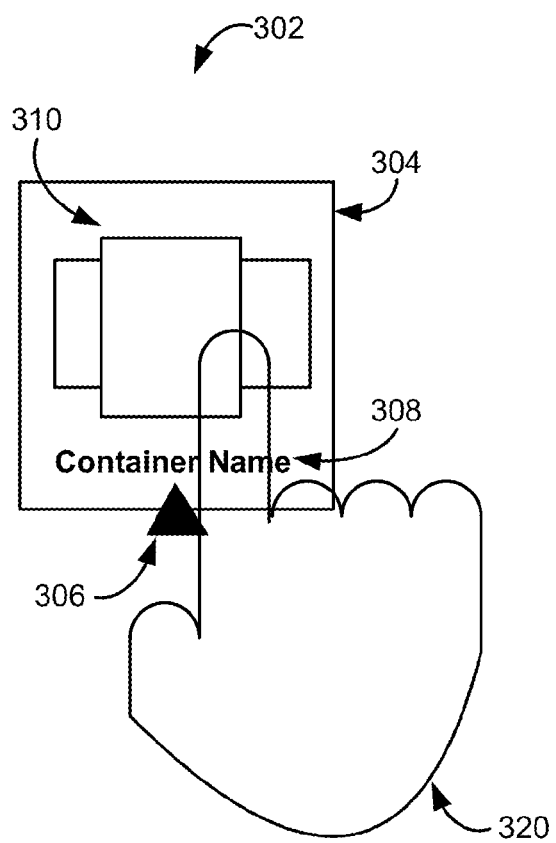
FIG. 3 shows a block diagram of an exemplary interaction of a user with an iconic representation of a multimedia container in accordance with one embodiment of the present invention.

FIG. 3 shows a block diagram of an exemplary interaction of a user with an iconic representation of a multimedia container in accordance with one embodiment of the present invention. Diagram 300 depicts an exemplary image representing a multimedia container selectable by a user. Selection of the image representing a multimedia container "opens" the multimedia container thereby displaying the objects within the multimedia container.

Image 302 comprises outline 304, shape 306, label 308, and multimedia container object images 310. Outline 304 may surround label 308 and multimedia container object images 310. Outline 304 and shape 306 are operable to indicate to a user that image 302 represents a multimedia container. In one exemplary embodiment, shape 306 is a triangle. It is appreciated that shape 306 may be different shapes or may not be present. Outline 304 may also not be present in some embodiments. Label 308 indicates the name of the multimedia container.

Multimedia container object images 310 represent objects within the multimedia container. In one exemplary embodiment, the images of multimedia container object images 310 are determined as described herein.

Embodiments of the present invention are operable to allow selection via a portion of user's hand 320 (e.g., index finger) to open the corresponding multimedia container and display the objects within the multimedia container. Embodiments of the present invention are further operable to allow a moving of an image representing a multimedia container via pressing and holding on the image representing the multimedia container. The image corresponding to the multimedia container may then be dragged to a new location (e.g., a new location within a parent multimedia container comprising the multimedia container).

Figure 4A:
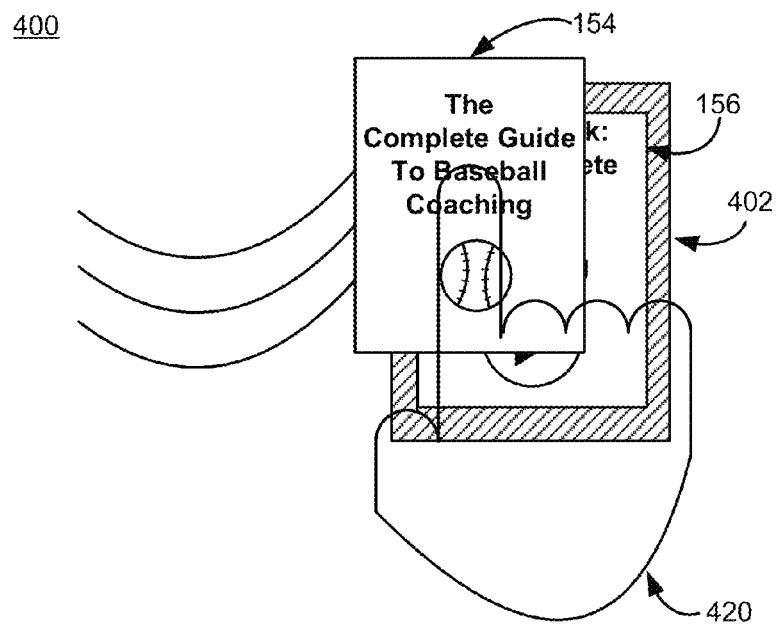
FIG. 4A shows a block diagram of an exemplary operation to create a multimedia container in accordance with one embodiment of the present invention.

FIG. 4A shows a block diagram of an exemplary operation to create a multimedia container in accordance with one embodiment of the present invention. FIG. 4A depicts an exemplary movement for creating a multimedia container via two objects.

As shown in FIG. 4A, a user's hand 420 has selected the image 154 (g., via pressing and holding on image 154), which corresponds to a book entitled "the complete guide to baseball coaching," and dragged it over image 156, which represents an audio book entitled "the complete guide to baseball coaching." Upon image 154 covering a specified portion (e.g., 25%) of image 156, colored area 402 is displayed to indicate that releasing image 154 will result in creation of a multimedia container comprises the objects corresponding to images 154 and 156. For example, the operation shown in FIG. 4A results in a multimedia container comprising the book entitled "the complete guide to baseball coaching" and the audio book entitled "the complete guide to baseball coaching." In one exemplary embodiment, colored area 402 may be a colored, shaded, and/or transparent area. Embodiments of the present invention support adding objects (e.g., pieces of content, applications, and widgets) to a multimedia container in a substantially manner by dragging the object over a multimedia container.

Figure 4B:
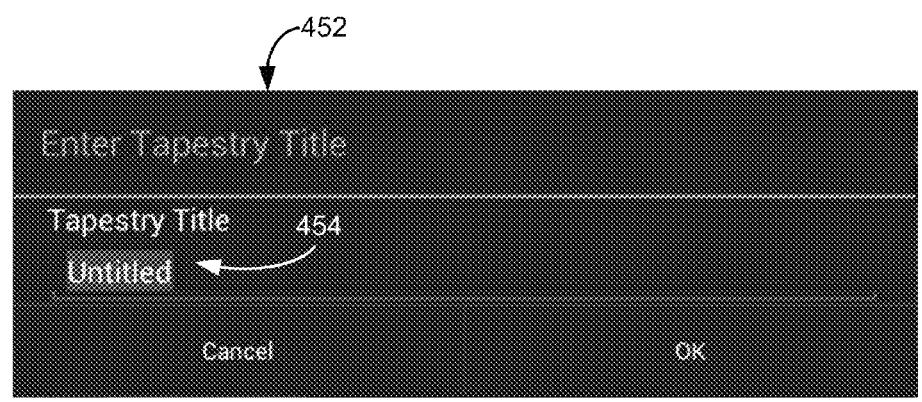
FIG. 4B shows an exemplary dialog box after an operation to create a multimedia container in accordance with one embodiment of the present invention.

Upon release of image 154 above colored area 402, a prompt to create a name for the multimedia container created may be displayed as shown in FIG. 4B.

FIG. 4B shows an exemplary dialog box after an operation to create a multimedia container in accordance with one embodiment of the present invention. FIG. 4B depicts an exemplary dialog box 452 for naming a multimedia container or tapestry. Exemplary dialog box 452 may be displayed after an action that can invoke the creation of a multimedia container.

Exemplary dialog box 452 allows a user to enter a name of a multimedia container or tapestry in text area 454 (e.g., via an on-screen keyboard). The user can then selected 'Ok' to have the multimedia container created with the name entered in text area 454. The user can also choose 'Cancel' to cancel the creation of a multimedia container. For example, the user may have accidentally release an object (e.g., image 154) over another object (e.g., image 156).

Figure 5A:
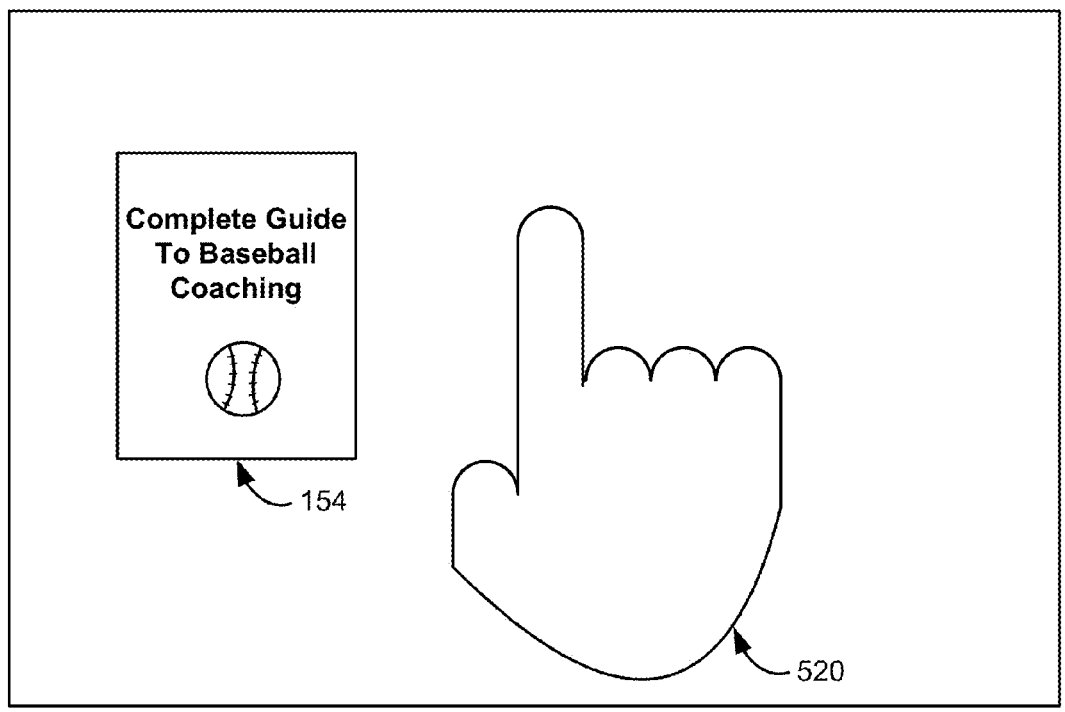
FIG. 5A shows a block diagram of another exemplary operation to create a multimedia container in accordance with one embodiment of the present invention.

FIG. 5A shows a block diagram of another exemplary operation to create a multimedia container in accordance with one embodiment of the present invention. Diagram 500 depicts an operation of invoking creation of an empty multimedia container. Multimedia containers can be created in a Home multimedia container and inside other multimedia containers. After a multimedia container has been created it can be moved around or moved from one multimedia container to another multimedia container.

In one exemplary embodiment, diagram 500 depicts an object area (e.g., object area 212) of a multimedia container. Diagram 500 comprises image 154 and empty space adjacent to image 154. Image 154 corresponds to an e-book within a multimedia container. User's hand 520 presses and holds a portion of empty space (e.g., in an object area of a multimedia container) which invokes an operation for choosing one of a plurality of actions comprising creation of a new multimedia container.

Figure 5B:
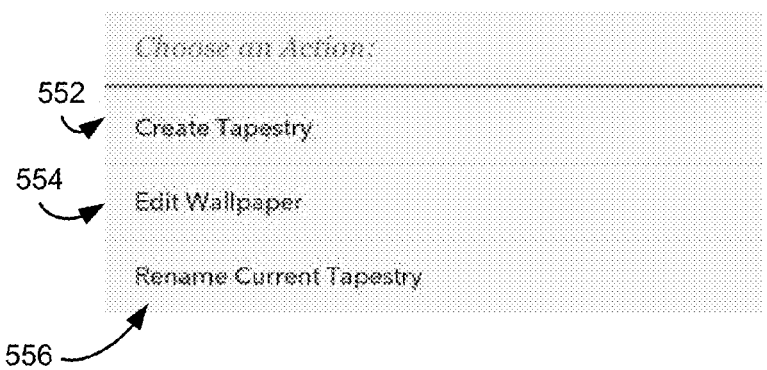
FIG. 5B shows an exemplary dialog box for creating a multimedia container, editing a wallpaper of a multimedia container, and renaming a multimedia container in accordance with one embodiment of the present invention.

FIG. 5B shows an exemplary dialog box for creating a multimedia container, editing a wallpaper of a multimedia container, and renaming a multimedia container in accordance with one embodiment of the present invention. FIG. 5B depicts an exemplary dialog box 550 operable for creating a new multimedia container.

Exemplary dialog box 550 comprises create tapestry button 552, edit wallpaper button 554, and rename current tapestry 556 button. Create tapestry button 552 is operable to invoke an operation for creating a multimedia container or tapestry. Exemplary dialog box 452 may be presented upon selection of create tapestry button 552.

Edit wallpaper button 554 is operable to invoke an operation for selecting a wallpaper of a multimedia container. In one embodiment, each multimedia container can have a respective wallpaper.

Rename current tapestry button 556 is operable to invoke an operation for renaming a multimedia container or tapestry that is currently being displayed. Renaming of a multimedia container may be done to make the multimedia container easier to find or to identify what is in the multimedia container. Renaming a multimedia media container does not change the contents or the location of the contents of the multimedia container. Exemplary dialog box 452 may be presented with text area 454 configured to the name of the multimedia container currently being displayed and thereby allow a user to rename the current multimedia container being displayed. In one exemplary embodiment, a pre-configured reading and home tapestry are not able to be renamed.

Figure 6A:
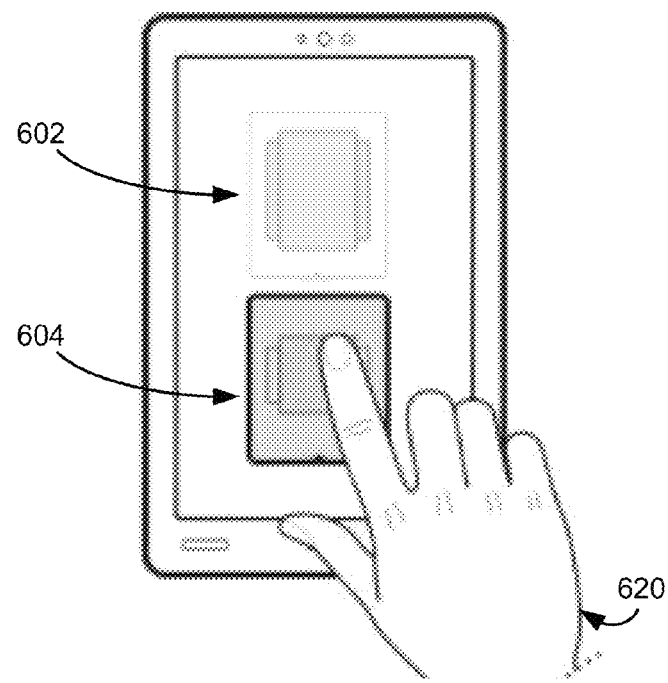
FIG. 6A shows a block diagram of an exemplary operation for moving a multimedia container in accordance with one embodiment of the present invention.

FIG. 6A shows a block diagram of an exemplary operation for moving a multimedia container in accordance with one embodiment of the present invention. FIG. 6A depicts a user moving a multimedia container from one location to another within a graphical user interface (e.g., of a mobile device).

Multimedia containers may be moved from one location to another location within a multimedia container containing the multimedia container being moved. For example, a multimedia container at the top left of the Home multimedia container for an event that is now over may be moved to another location and replaced with something a user is currently planning. Multimedia containers can be moved out of a multimedia container. For example, a multimedia container may be moved from inside a multimedia container to a multimedia container at a level above the current location of the multimedia container. Multimedia containers may be moved between multimedia containers. For example, a multimedia container may be moved from inside one multimedia container to another multimedia container. Multimedia containers may be moved inside another multimedia container.

Diagram 600 shows a user moving a multimedia container image 606 from position 606 to position 604. In one exemplary embodiment, a user's hand 620 selects multimedia container image 606 at position 602 by pressing and holding within the area where multimedia container image 606 is displayed. A finger of user's hand 620 can then drag multimedia container image 606 to location 604. When the finger of user's hand 620 releases multimedia container image 606 at location 604, the location of the multimedia container image 606 will be stored as location 604.

Figure 6B:
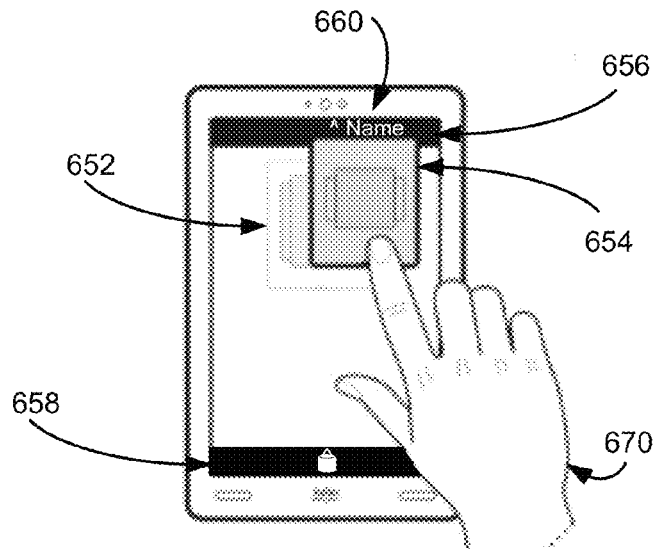
FIG. 6B shows a block diagram of an exemplary operation for moving or deleting a multimedia container in accordance with one embodiment of the present invention.

FIG. 6B shows a block diagram of an exemplary operation for moving or deleting an object or multimedia container in accordance with one embodiment of the present invention. FIG. 6B depicts an exemplary graphical user interface allowing a user to delete a multimedia container or move the multimedia container into another multimedia container.

A finger of user's hand 670 selects a multimedia container 654 at location 652 (e.g., via pressing and holding on the area of multimedia container 654) and bars 656 and 658 are displayed. A user that is no longer using a multimedia container may delete the multimedia container. By dragging an object or multimedia container 654 to bar 658 the object or multimedia container is deleted. The dragging of a multimedia container to bar 658 may result in changing color (e.g., from black to blue). Upon the user releasing the multimedia container over bar 658, the user may be prompted with a delete button to perform the deletion.

The deleting of a multimedia container may delete the items within the multimedia container and any multimedia containers within the multimedia container being deleted. In one embodiment, applications within a multimedia container are not deleted upon deleting of the multimedia container. Bar 658 may comprises a trash can icon or the words "delete" or "remove." In one exemplary embodiment, a user may be prompted before deleting a multimedia container comprising one or more objects.

By dragging an object or multimedia container 654 to bar 656, the object or multimedia container is moved to a multimedia container comprising the multimedia container corresponding to multimedia container image 654 (e.g., or the selected multimedia container. The multimedia container one level up may then be opened. The multimedia container 654 may then be positioned within the multimedia container one level up. In one exemplary embodiment, bar 656 comprises an arrow or symbol (e.g., '^') and a label 660 of the multimedia container comprising multimedia container 654 or the multimedia container currently being displayed. In one embodiment, multimedia container 654 is moved up one level in a hierarchy of multimedia containers by selecting and moving multimedia container 654 to bar 656.

Figure 7A:
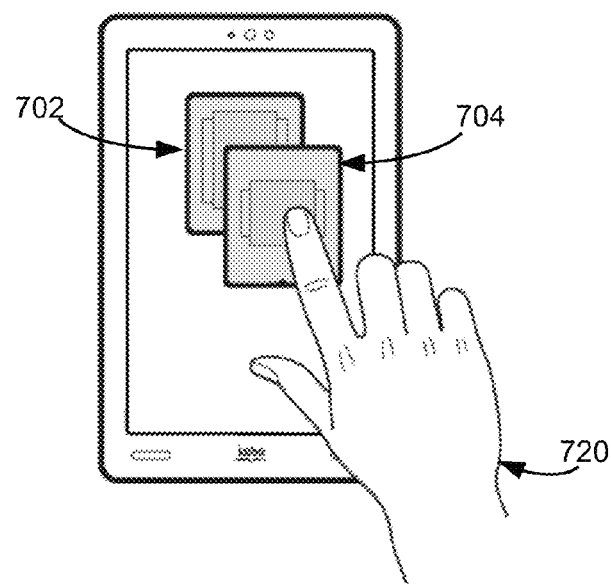
FIG. 7A shows a block diagram of an exemplary operation for moving or deleting a multimedia container in accordance with one embodiment of the present invention.

FIG. 7A shows a block diagram of an exemplary operation for moving a multimedia container into another multimedia container in accordance with one embodiment of the present invention. FIG. 7A depicts a user relocating a multimedia media container into another multimedia container.

A finger of user's hand 720 has been used to select multimedia container 704 (e.g., via pressing and holding on multimedia container 704). The user then drags multimedia container 704 onto or over multimedia container 702. In one exemplary embodiment, upon dragging multimedia container 704 over multimedia container 702, multimedia container 702 is displayed or opened thereby allowing placing of multimedia container 704 into a specific location within multimedia container 702.

Embodiments of the present invention are operable for allowing movement of an object into a multimedia container (e.g., app, widget, audio file, album, video, weblink, book, etc.). For example, if a finger of user's hand 720 selects an object (e.g., via pressing and holding) and drags the item over a multimedia container, the multimedia container is displayed thereby allowing the user to place the object at a specific location within the multimedia container.

Figure 7B:
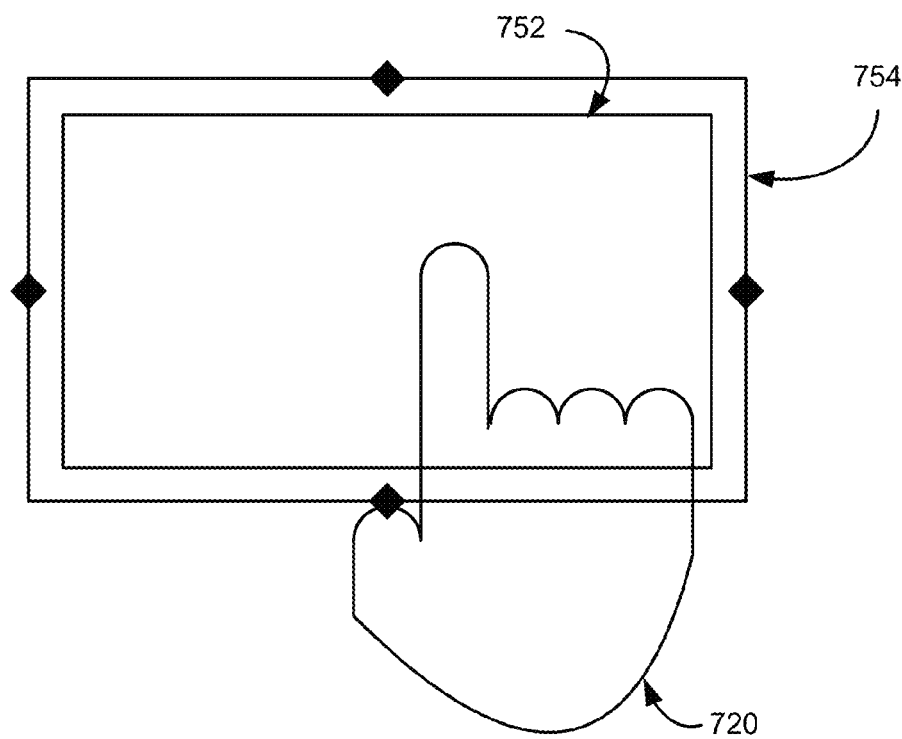
FIG. 7B shows a block diagram of an exemplary operation for resizing an image corresponding to an object within a multimedia container in accordance with one embodiment of the present invention.

FIG. 7B shows a block diagram of an exemplary operation for resizing an image corresponding to an object within a multimedia container in accordance with one embodiment of the present invention. FIG. 7B depicts a user invoking a resize operation via pressing and holding on an image of a displayed multimedia container.

Image 752 corresponds to an object within a multimedia container. Image 752 may correspond to an image file, a book, video, song, album, website, etc. A finger of user's hand 720 presses and holds on image 752 until a line appears around the edge of image 752. Upon release resize guides 754 are displayed. Resize guides 754 may be selected via along a line portion or a shape (e.g. diamond) portion. In one embodiment, image 752 has an aspect ratio substantially similar to the image of the content to which image 752 corresponds. For example, image 752 may have a portrait aspect ratio because image 752 comprises a book cover. In one exemplary embodiment, the aspect ratio of image 752 is maintained while image 752 is scaled to a size configured by the user via resize guides 754.

In one embodiment, resizing functionality is invoked via pressing and holding and releasing image 752 at the same location. If the releasing following the pressing and holding is at a different location, image 752 may be moved accordingly. For example, if the user drags his finger to a new location, image 752 will be moved to the new location. Embodiments of the present invention thereby allow user configured relative placement and relative sizing of objects within a multimedia container. For example, a user may enlarge the size of a book cover because the book is important to the user or it may be more visually pleasing to have a larger book cover image. Embodiments of the present invention support resizing of image of any object type.

Figure 8:
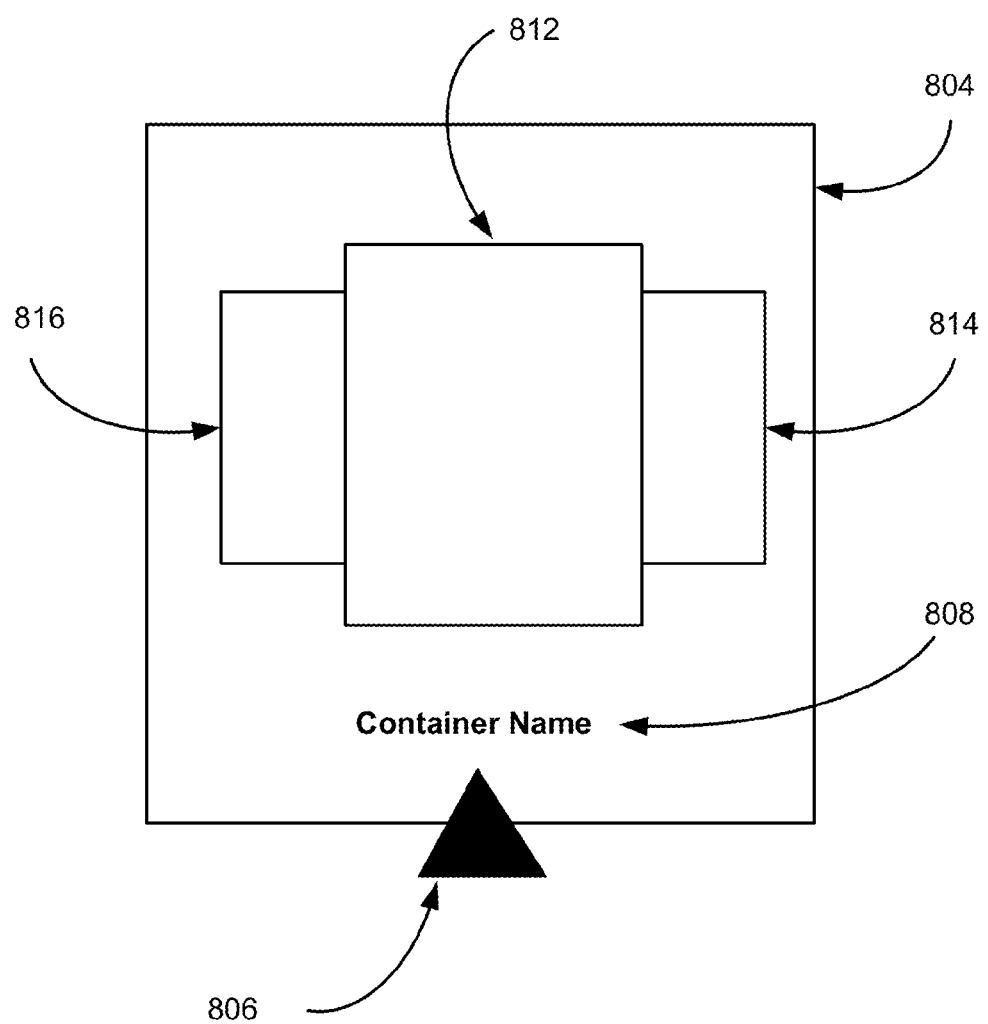
FIG. 8 shows a block diagram of an exemplary image representing a multimedia container in accordance with one embodiment of the present invention.

FIG. 8 shows a block diagram of an exemplary image representing a multimedia container in accordance with one embodiment of the present invention. FIG. 8 depicts an image 800 comprising a minimized multimedia container.

Image 800 comprises outline 804, shape 806, label 808, and images 812, 814, and 816. Outline 804 may surround label 808 and multimedia container object images 310. Outline 804 and shape 806 are operable to indicate to a user that image 800 represents a multimedia container. In one exemplary embodiment, shape 806 is a triangle. It is appreciated that shape 806 may be different shapes or may not be present. Outline 804 may also not be present in some embodiments. Label 808 indicates the name of the multimedia container.

Images 812, 814, and 816 correspond to objects within a multimedia container corresponding to image 800. In one embodiment, images 812, 814, and 816 correspond to the most recently used or last accessed objects within the corresponding multimedia container. In one exemplary embodiment, image 812 is a scaled image of an object of the multimedia container that was most recently used. Image 812 may be larger than images 814 and 816 and centered within image 800. Image 816 corresponds to the object that is the second most recently used and image 814 corresponds to the object that is the third most recently used. Image 800 thereby is operable to provide a visual reminded of what where the user was in the multimedia container and what activity the user was doing (e.g., reading a book, listening to a song, watching a video). In one embodiment, images 812, 814, and 816 are updated periodically (e.g., once an hour, daily, or the like). For example, if image 812 corresponds to a newspaper website, image 812 may be updated daily.

In one embodiment, selection of image 800 opens the corresponding multimedia container thereby allowing a user to access content, applications, and widgets within the multimedia container. In another embodiment, images 812, 814, and 816 are selectable such that a user can select one of images 812, 814, and 816 and launch the appropriate action (e.g., an application operable to render the content corresponding to the selected image) corresponding to the selected image.

Figure 9A:
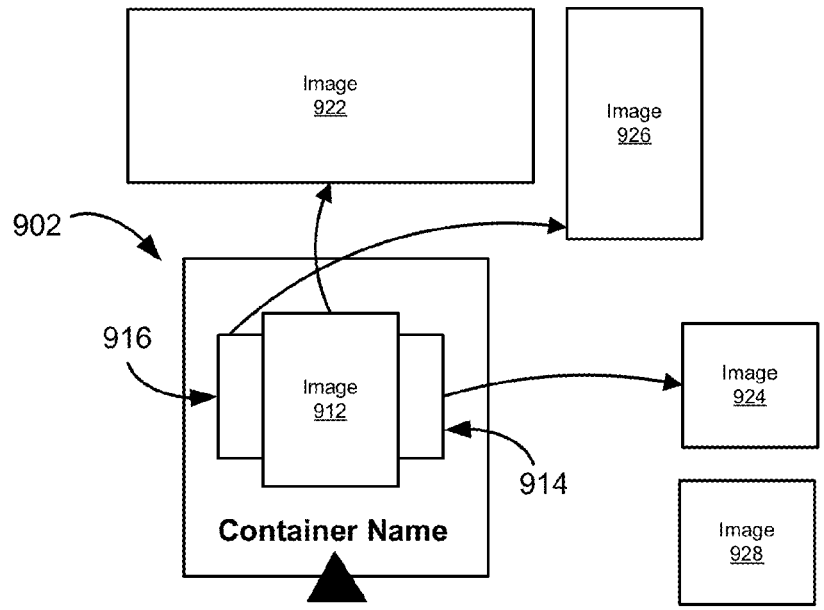
FIG. 9A shows a block diagram of an animation of opening a multimedia container in accordance with one embodiment of the present invention.

FIG. 9A shows a block diagram of an animation of opening a multimedia container in accordance with one embodiment of the present invention. FIG. 9A depicts an exemplary movement of objects during the opening of a multimedia container.

Image 902 corresponds to a multimedia container. The multimedia container is operable to be displayed upon invoking an open operation via selection of the multimedia container. In one exemplary embodiment, image 902 comprises a label, outline, and shape substantially similar to image 302.

Image 902 further comprises images 912, 914, and 916. Images 912-916 correspond to objects within the multimedia container corresponding to image 902. In one embodiment, portions of images 914 and 916 are behind image 912. In one exemplary embodiment, images 912, 914, and 916 are scaled version of images 922, 924, and 926, respectively. Image 912, 914, and 916 may be scaled according to a predetermined size of an image (e.g., image 902) corresponding to a multimedia container.

Images 912, 914, and 916 may have respective aspect ratio corresponding to the objects (e.g., pieces of content or applications) that images 912, 914, and 916 represent. For example, image 912 may correspond to a photograph having a width greater than a height of the photograph. Image 912 may thus have a width greater than its height.

Upon selection of image 902 (e.g., via a touch or press), the multimedia container corresponding to image 902 is opened. Images 912, 914, and 916 are moved and scaled to become images 922, 924, and 926, respectively. In one exemplary embodiment, images 912, 914, and 916 are moved and scaled concurrently to become images 922, 924, and 926, respectively. In one embodiment, image 912 remains in the foreground relative to images 914 and 916 while moving and being transformed into image 922. Images 914 and 916 remain in the background relative to image 912 while moving and being transformed into images 924 and 926.

The movement is based on the location of images 912, 914, and 916 and the locations of the images 922, 924, and 926 within the opened or displayed multimedia container. The scaling is based on the size of images 922, 924, and 926 within the opened or displayed multimedia container.

Image 928 corresponds to another object within the multimedia container corresponding to image 902. Image 928 may be an object not represented within image 902 as part of the multimedia container corresponding to image 902. In one exemplary embodiment, image 928 appears from a point corresponding to a center of the portion of the screen wherein image 928 is located within the multimedia container. Image 928 may be described as appears from the background.

Figure 9B:
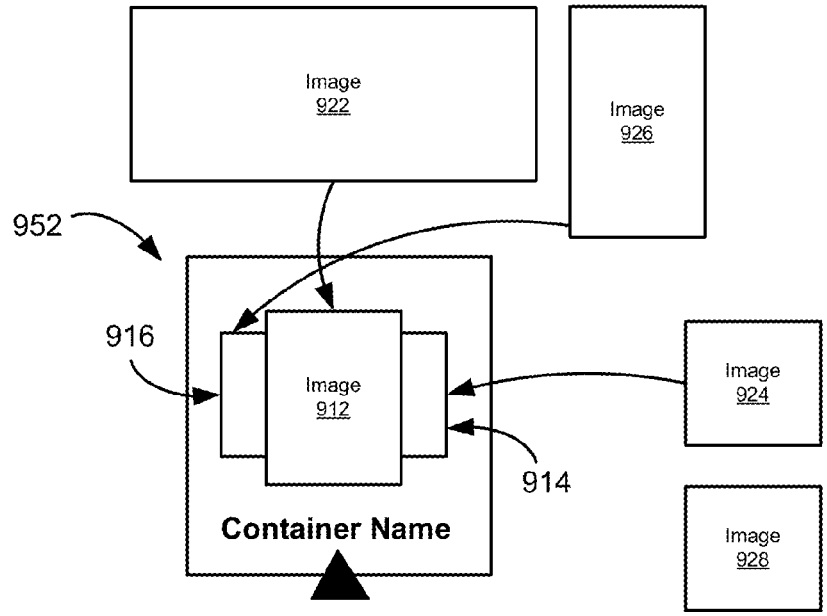
FIG. 9B shows a block diagram of an animation of minimizing a multimedia container in accordance with one embodiment of the present invention.

FIG. 9B shows a block diagram of an animation of minimizing a multimedia container in accordance with one embodiment of the present invention. FIG. 9B depicts an exemplary movement of objects during the minimizing of a multimedia container. The minimizing or closing of a multimedia container may be invoked by a back function (e.g., back control 160) or home function (e.g., home control 162).

Images 922, 924, and 926 are transformed and moved to form image 952 corresponding to a multimedia container. In one embodiment, images 922, 924, and 926 are transformed to images 912, 914, and 916 while maintaining the respective aspect ratios of images 922, 924, and 926. Images 912, 914, and 916 may have the same respective aspect ratios as images 922, 924, and 926, respectively. Image 928 disappears as images 922, 924, and 926 are transformed and moved into images 912, 914, and 916. In one exemplary embodiment, image 928 may shrink to a center point of image 928 until no longer visible before being no longer displayed. In one embodiment, image 922 remains in the foreground relative to images 924 and 926 while moving and being transformed into image 912. Images 924 and 926 may remain in the background relative to image 922 while moving and being transformed into images 914 and 916.

Figure 10:
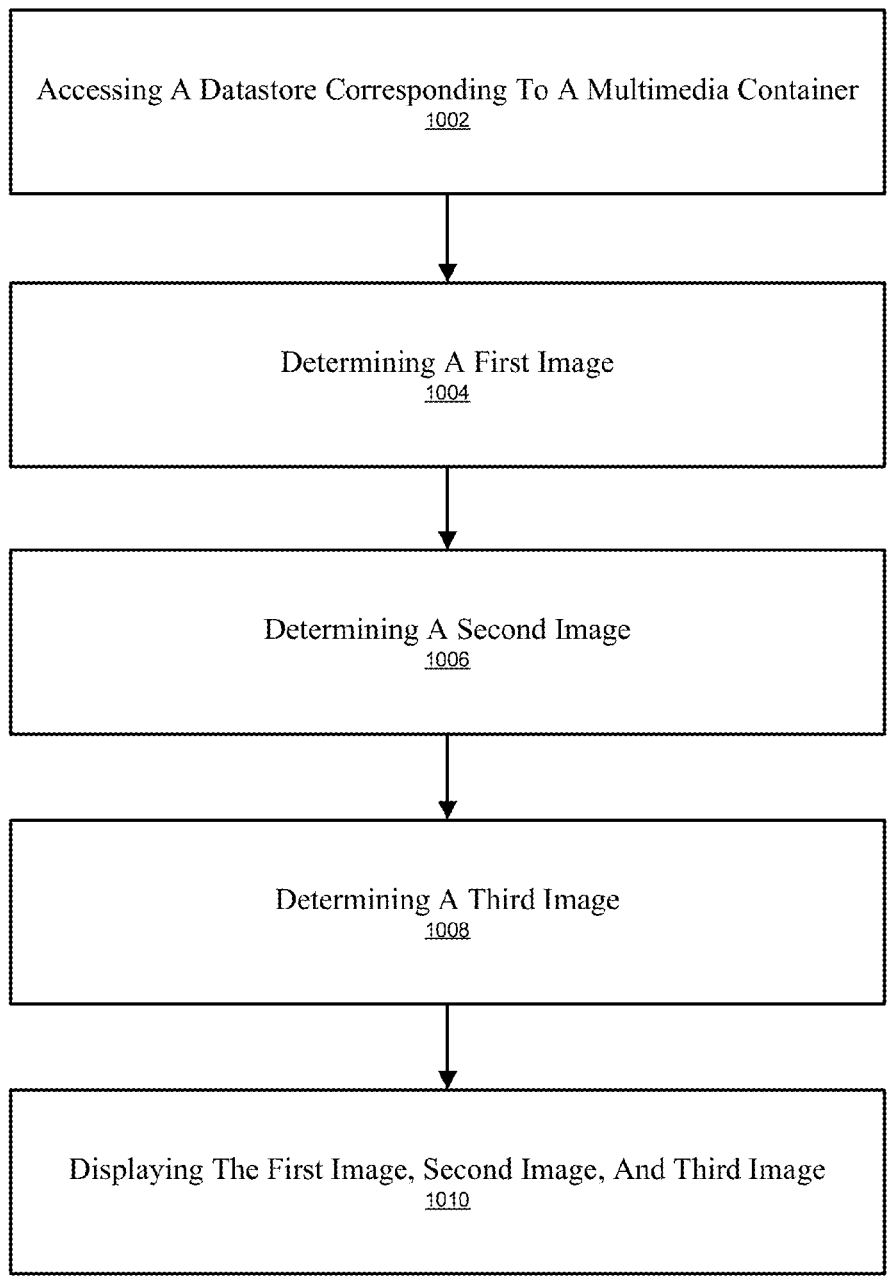
FIG. 10 shows a flowchart of an exemplary computer controlled process for generating a graphical user interface in accordance with one embodiment of the present invention.
Figure 11:
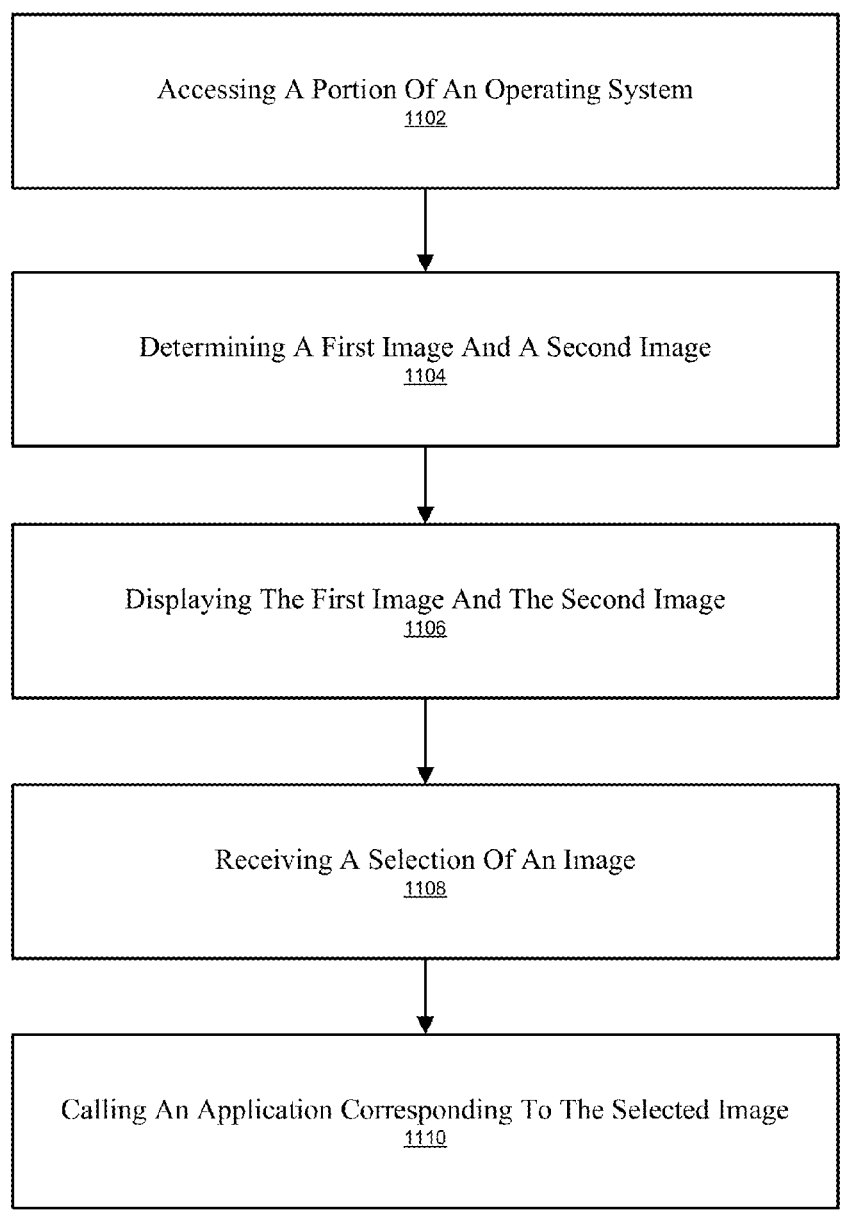
FIG. 11 shows a flowchart of an exemplary computer controlled process for displaying a home multimedia container in accordance with one embodiment of the present invention.
Figure 13:
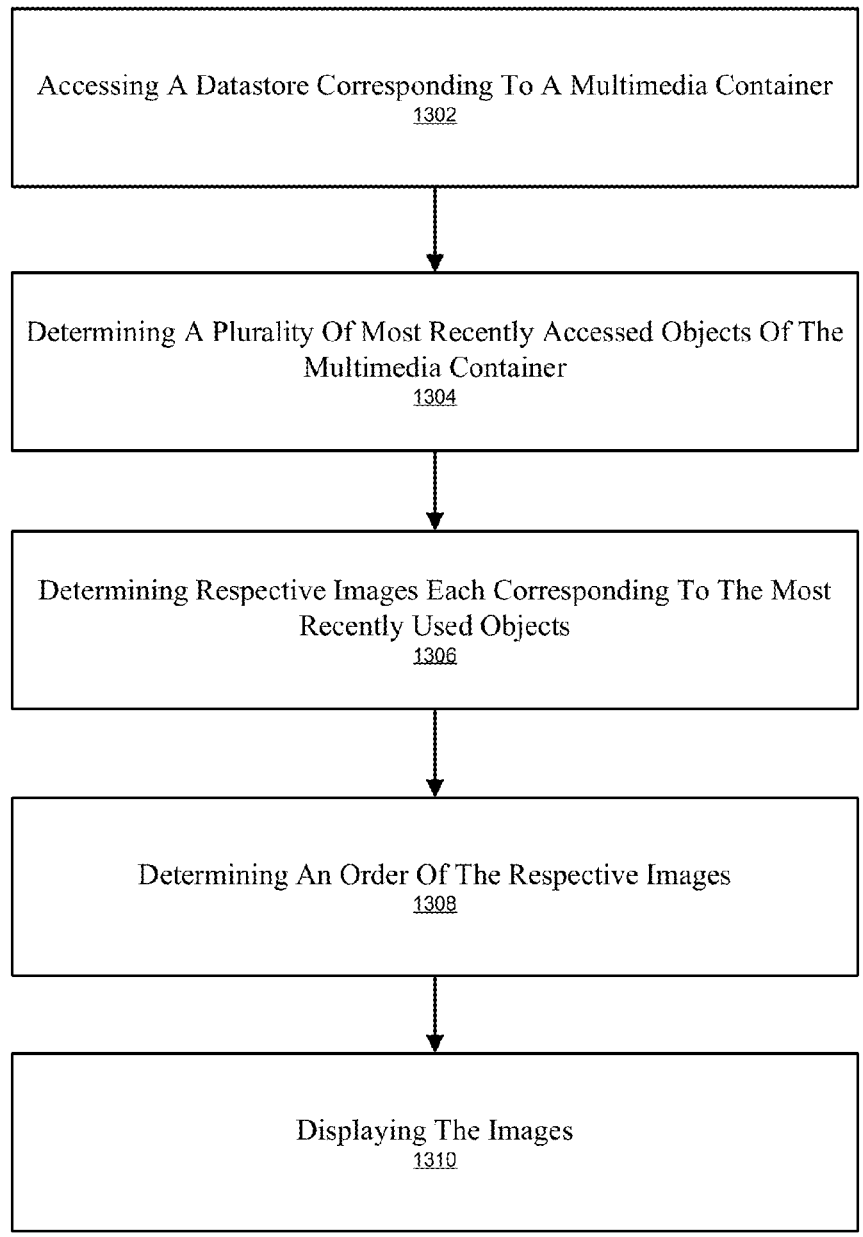
FIG. 13 shows a flowchart of an exemplary computer controlled process for generating a visual representation of a multimedia container in accordance with one embodiment of the present invention.

With reference to FIGS. 10-11 and 13, flowcharts 1000, 1100, and 1300 illustrate example functions used by various embodiments of the present invention for configuration and access of memory. Although specific function blocks ("blocks") are disclosed in flowcharts 1000, 1100, and 1300, such steps are examples. That is, embodiments are well suited to performing various other blocks or variations of the blocks recited in flowcharts 1000, 1100, and 1300. It is appreciated that the blocks in flowcharts 1000, 1100, and 1300 may be performed in an order different than presented, and that not all of the blocks in flowcharts 1000, 1100, and 1300 may be performed.

FIG. 10 shows a flowchart of an exemplary computer controlled process for generating a graphical user interface in accordance with one embodiment of the present invention. FIG. 10 depicts an exemplary flowchart 1000 of a process for displaying a graphical user interface comprising images corresponding to content and/or applications.

At block 1002, a datastore corresponding to a multimedia container is accessed. In one embodiment, the accessing of the datastore corresponding to a multimedia container is performed within a mobile device (e.g., tablet computing device, smartphone, etc.). The multimedia container may comprise a first object and a second object, wherein the first object is a first portion of content and the second object is a second portion of content. The datastore may further comprise information about the first object and the second object. In one embodiment, the first portion content is of a first media type and the second portion of content is of a second media type. In one exemplary embodiment, the second object corresponds to a first application.

The multimedia container may further comprise a third object and wherein datastore comprises information about the third object, where the third object is a second portion of content.

At block 1004, a first image is determined. The first image may be determined based on the information about the first object. In one embodiment, the determining of the first image is performed by an operating system. The first portion of content is an electronic book file and the first image comprises a book cover.

At block 1006, a second image is determined. The second image may be determined based on the information about the second object. In one exemplary embodiment, the determining of the second image based on the information about the application. In one embodiment, the second image is an application icon.

At block 1008, a third image is determined. The third image may be determined based on the information about the second portion of content.

At block 1010, the first image and the second image are displayed. In one embodiment, a size of the first image is user configurable. For example, the first image has at least one dimension greater in size than a dimension of the second image.

At block 1012, the first image is selected. The selection of the first image is operable to launch a first application operable to render the first portion of content. In one embodiment, the second object is accessible via a second application. In one exemplary embodiment, the selection of the second image is operable to launch the first application, and wherein selection of the first image is operable to launch a second application operable to render the first portion of content.

The second portion of content may be an audio file and the third image comprises an album cover. The second portion of content may be a video file and the third image comprises a key frame of the video file. The third image comprises an indicator of a rendering operation operable to be performed on the second portion of content (e.g., a play symbol). The first portion of content may be a website address and the first image comprises an image of a website corresponding to the website address.

FIG. 11 shows a flowchart of an exemplary computer controlled process for displaying a home multimedia container in accordance with one embodiment of the present invention. FIG. 11 depicts a process of displaying home multimedia container and exemplary execution of an application corresponding to an object of the home multimedia container.

At block 1102, a portion of an operating system is accessed. In one exemplary embodiment, the portion of the operating system accessed within a mobile device and the portion of the operating system corresponds to a mobile device (e.g., tablet computing device, smartphone, etc.).

In one embodiment, the portion of the operating system comprises a datastore (e.g., database, data structure, etc.) corresponding to a home multimedia container. The home multimedia container may comprises a first object and a second object, where the first object is a first portion of content and the second object is an application. The datastore may comprise information about the first object and the second object. In one exemplary embodiment, the home multimedia container is at a top or root position in a hierarchy of multimedia containers.

In another exemplary embodiment, the home multimedia container comprises a third object which is a multimedia container (e.g., a multimedia container within the home multimedia container). The home multimedia container may comprise a fourth object which has a media type different than a media type of the first object of the home multimedia container.

At block 1104, a first image and a second image are determined. In one embodiment, the first image and the second image are determined based on the information about the first and second object, respectively, within the datastore. In one exemplary embodiment, the second image is determined based on an application icon corresponding to the application. In one embodiment, where the second image corresponds to a multimedia container, the second image is determined based on the plurality of objects within the multimedia container.

At block 1106, the first image and the second image are displayed. In one embodiment, the first image is displayed adjacent to the second image. The displaying of the first and second image may be performed by an operating system. In one embodiment, the displaying is performed in response to performance of an unlock function (e.g., a screen unlock function, user authentication function, security function, etc.). The displaying may also be performed as part of a startup sequence of the operating system.

At block 1108, a selection of an image is received. For example, each image of the displayed home container may be selectable to launch an application, launch an application for viewing of content corresponding to the image, or open a multimedia container corresponding to the image (e.g., a multimedia container within home multimedia container).

At block 1110, an application corresponding to the selected image is called. In one exemplary embodiment, a selection of the first image is operable to launch a first application operable to render the first portion of content. A selection of an image corresponding to a multimedia container is operable to cause opening or displaying of the plurality of objects of the multimedia container. In one embodiment, a selection of the second image is operable to launch the application corresponding to the second image. In one exemplary embodiment, selection of the first image and dragging the first image over the second image is operable for moving the first object into the multimedia container.

Figure 12:
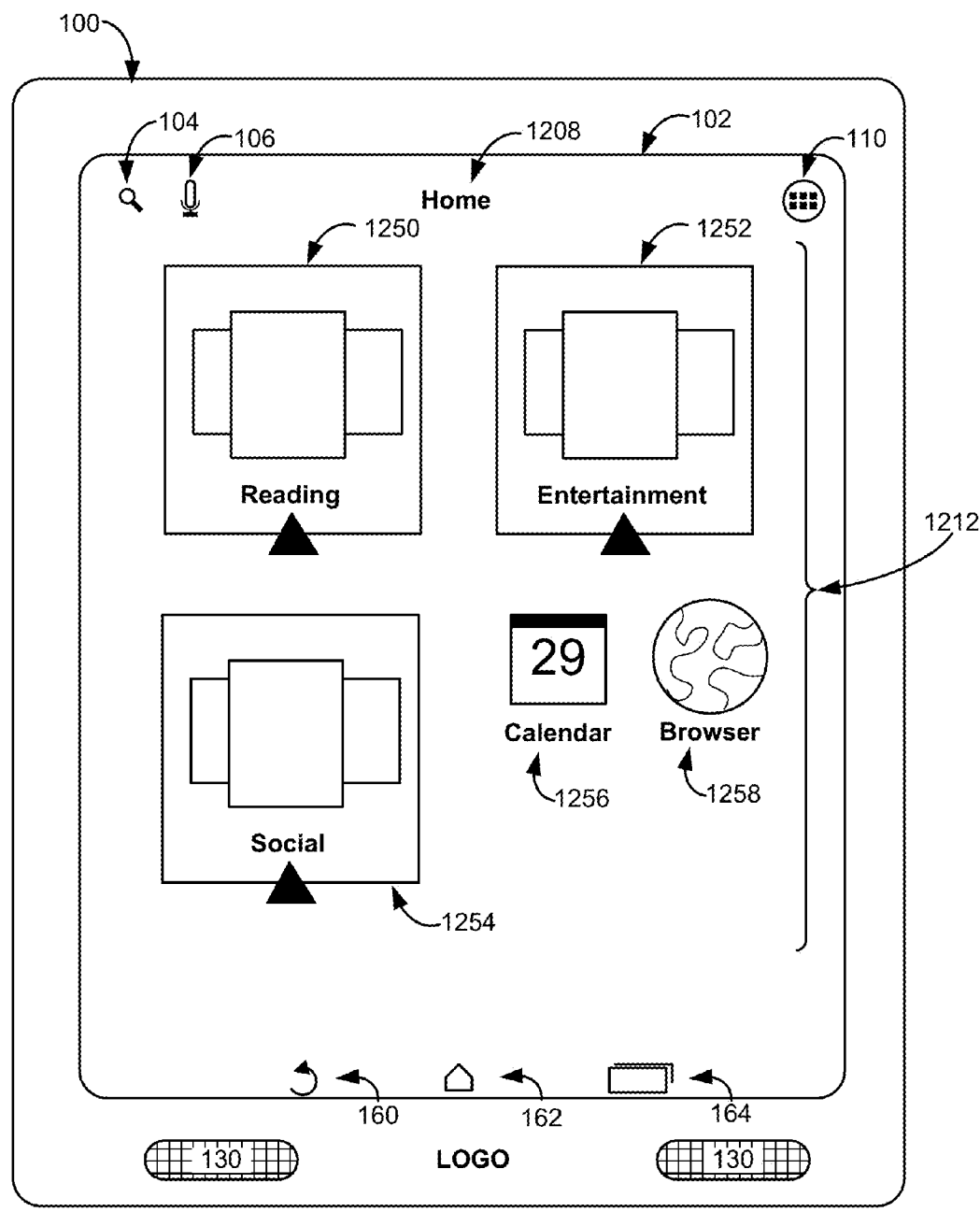
FIG. 12 shows a block diagram of an exemplary home multimedia container in accordance with one embodiment of the present invention.

FIG. 12 shows a block diagram of an exemplary a home multimedia container in accordance with one embodiment of the present invention. FIG. 12 depicts a home multimedia container that may be presented upon boot up of an operating system or a home multimedia container accessed during interaction with an operating system. Elements 100-110, 130, and 160-164 may have functionality substantially similar to similarly numbered elements as described with respect to FIG. 1.

Images 1250-1254 correspond to respective multimedia containers. Image 1250 corresponds to a reading multimedia container. Image 1252 corresponds to an entertainment multimedia container. Image 1254 corresponds to a social multimedia container. Image 1256 is an image corresponding to a calendar application. Image 1258 is an image corresponding to a browser application.

In one embodiment, multimedia containers are organized in a hierarchical format with a Home multimedia container at the top or root of the hierarchy. Multimedia containers can then be created in the Home multimedia container. Multimedia containers can be then created in the multimedia containers created within the Home multimedia container. For example, a music multimedia container could be created in the home multimedia container. Within the music multimedia container a jazz multimedia container and a classical multimedia container could be created. Within the jazz multimedia container a smooth jazz multimedia container and a jazz fusion multimedia container could be created.

In one embodiment, the home multimedia container or tapestry comprises pre-loaded multimedia containers with pre-selected content. The pre-loaded multimedia containers may include a reading multimedia container, an entertainment multimedia container, a browsing multimedia container, and a social multimedia container. The reading multimedia container may include applications and widgets for reading books, magazines, comics, manga, etc. The entertainment multimedia container may include applications and widgets for videos, games, music, etc. The browsing multimedia container may include links to popular websites such as www.google.com, www.yahoo.com, www.msn.com, and www.twitter.com. The social multimedia container may include applications and widgets for social activities such as Pinterest™ of Pinterest Corporation of Palo Alto, Calif., Twitter™ from Twitter Corporation of San Francisco, Calif., and Skype™ from Microsoft Corporation of Redmond, Wash.

In one embodiment, a multimedia container may be moved to the Home multimedia container by a user pressing and holding the multimedia container to be moved and dragging the multimedia container to a bar at the top of the screen (e.g., bar 656) until the multimedia container one level up is opened. Then the multimedia container may be dragged briefly out of the bar and dragged up again to the bar at the top of the screen. The dragging out of the bar and into the bar at the top of the screen may be performed until the Home multimedia container is opened.

FIG. 13 shows a flowchart of an exemplary computer controlled process for generating a visual representation of a multimedia container in accordance with one embodiment of the present invention. FIG. 13 depicts a process for determining and displaying the objects most recently accessed within a multimedia container as a portion of graphical user interface. The displaying of the objects most recently used in a multimedia container may be used to represent a multimedia container in a minimized form (e.g., as a user navigates at a level above the objects in the multimedia container).

At block 1302, a datastore corresponding to a multimedia container is accessed. In one embodiment, a datastore corresponding to a multimedia container is accessed within a mobile device (e.g., tablet computing device, smartphone, etc.). The multimedia container comprises a plurality of objects. In one exemplary embodiment, the multimedia container comprises a first object which is a first portion of content and a second object which is a second portion of content. The datastore may further comprise information about the plurality of objects (e.g., metadata about the objects).

At block 1304, a plurality of most recently accessed objects of the multimedia container is determined. In one embodiment, the plurality of most recently used objects of the multimedia container is determined based on the information (e.g., metadata) about each within the multimedia container.

At block 1306, a respective image corresponding to each of the most recently used objects is determined. In one exemplary embodiment, a first respective image corresponds to a piece of content and a second respective image corresponds to an application icon. In another embodiment, a first respective image corresponds to a first portion content of a first media type and a second respective image corresponds to a second portion of content of a second media type.

In one exemplary embodiment, a first respective image corresponds to a piece of content and a second respective image corresponds to an application. In another embodiment, a first respective image corresponds to a piece of content and a second respective image corresponds to another multimedia container. In one embodiment, a first respective image corresponds to a first piece of content and a second respective image corresponds to a second piece of content. For example, a first respective image corresponds to a first portion content of a first media type and a second respective image corresponds to a second portion of content of a second media type. In one embodiment, a respective image comprises a scaled image corresponding to an image representing a portion of content.

At block 1308, an order of each respective image is determined. In one embodiment, the order of each respective image based on a respective access time of a respective object corresponding to the respective image.

At block 1310, the images are displayed. In one embodiment, an image comprising each respective image according to the order, wherein the image corresponds to the multimedia container. In one exemplary embodiment, a first respective image corresponding to most recently used object of the plurality of most recently accessed objects of the multimedia container is displayed in a foreground position relative to a second respective image. A second respective image corresponding to a second most recently used object of the plurality of most recently accessed objects and the second respective image is displayed in a background position relative to the first respective image. The image comprising each respective image may be operable upon selection to invoke an operation to open the multimedia container. A respective portion of the image comprising each respective image is operable upon selection to open a piece of content corresponding to each respective image.

In another embodiment, the plurality of respective images is displayed. The images may be displayed such that each respective image is selectable. A selection of a respective image of the plurality of respective images may then be received. An application corresponding to a selected respective image and a respective object may be launched upon selection.

In one embodiment, a first respective image corresponding to a most recently used object is displayed in a foreground relative to a second respective image corresponding to a second most recently used object. The first respective image may further be displayed at an offset from a position of a second respective image.

Figure 14:
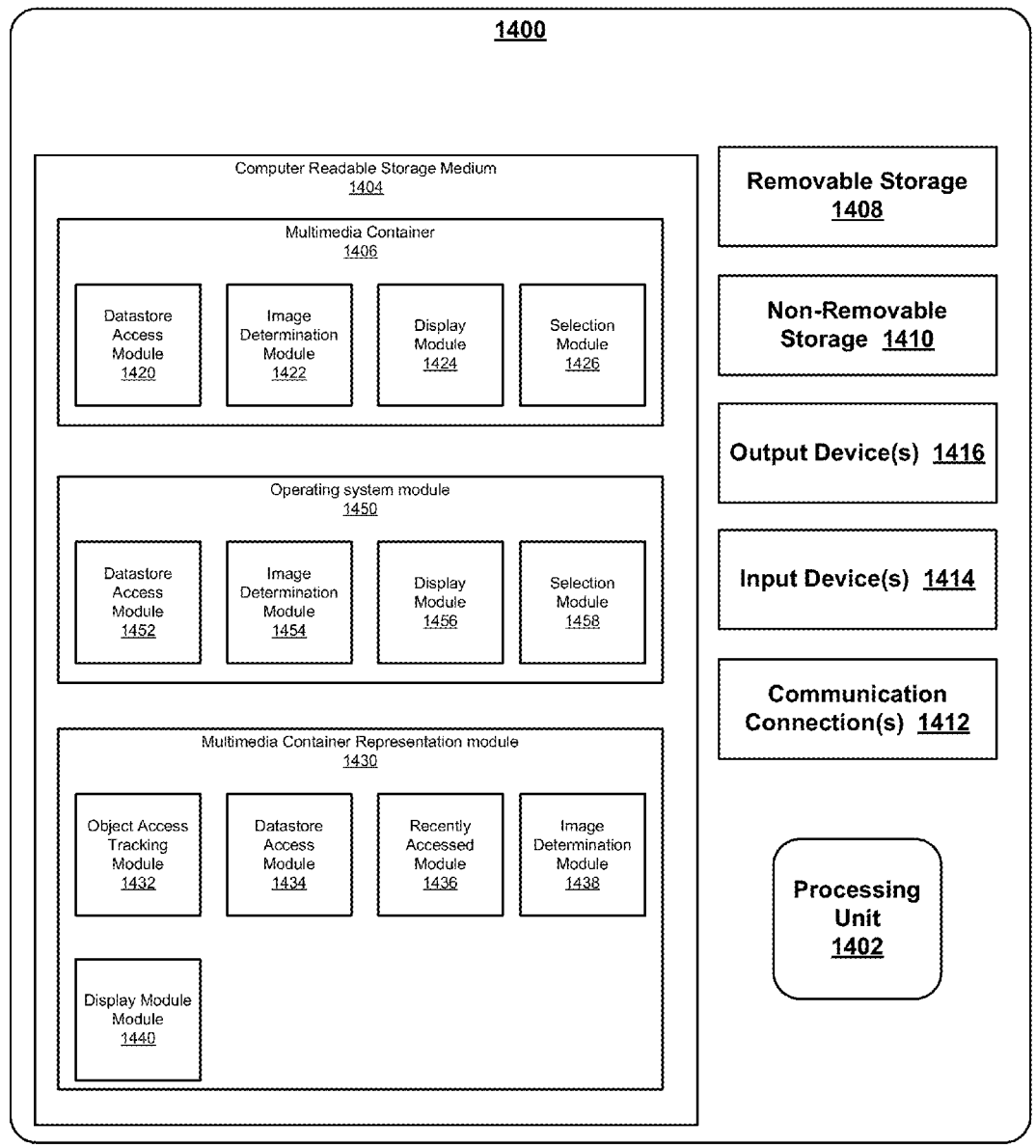
FIG. 14 shows a block diagram of exemplary computing system and corresponding modules, in accordance with one embodiment of the present invention.

FIG. 14 illustrates exemplary components used by various embodiments of the present invention. Although specific components are disclosed in computing system environment 1400, it should be appreciated that such components are exemplary. That is, embodiments of the present invention are well suited to having various other components or variations of the components recited in computing system environment 1400. It is appreciated that the components in computing system environment 1400 may operate with other components than those presented, and that not all of the components of system 1400 may be required to achieve the goals of computing system environment 1400.

FIG. 14 shows a block diagram of exemplary computer system and corresponding modules, in accordance with one embodiment of the present invention. With reference to FIG. 14, an exemplary system module for implementing embodiments includes a general purpose computing system environment, such as computing system environment 1400. Computing system environment 1400 may include, but is not limited to, servers, desktop computers, laptops, tablet PCs, tablet computing devices, mobile devices, and smartphones. In its most basic configuration, computing system environment 1400 typically includes at least one processing unit 1402 and computer readable storage medium 1404. Depending on the exact configuration and type of computing system environment, computer readable storage medium 1404 may be volatile (such as RAM), non-volatile (such as ROM, flash memory, etc.) or some combination of the two. Portions of computer readable storage medium 1404 when executed facilitate efficient execution of memory operations or requests for groups of threads.

Computing system environment 1400 may further include a power source (e.g., battery) (not shown) operable to allow computing system environment 1400 to be movable and mobile while operating.

Additionally, computing system environment 1400 may also have additional features/functionality. For example, computing system environment 1400 may also include additional storage (removable and/or non-removable) including, but not limited to, magnetic or optical disks or tape. Such additional storage is illustrated in FIG. 10 by removable storage 1408 and non-removable storage 1410. Computer storage media includes volatile and nonvolatile, removable and non-removable media implemented in any method or technology for storage of information such as computer readable instructions, data structures, program modules or other data. Computer readable medium 1404, removable storage 1408 and non-removable storage 1410 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 1400. Any such computer storage media may be part of computing system environment 1400.

Computing system environment 1400 may also contain communications connection(s) 1412 that allow it to communicate with other devices. Communications connection(s) 1412 is an example of communication media. Communication media typically embodies computer readable instructions, data structures, program modules or other data in a modulated data signal such as a carrier wave or other transport mechanism and includes any information delivery media. The term computer readable media as used herein includes both storage media and communication media.

Communications connection(s) 1412 may allow computing system environment 1400 to communication over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), Near Field Communication (NFC), Code Division Multiple Access (CDMA), Global System for Mobile Communications (GSM), Long-term Evolution (LTE), Worldwide Interoperability for Microwave Access (WiMax), wide area networks (WAN) such as the internet, serial, and universal serial bus (USB). It is appreciated the various network types that communication connection(s) 1412 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 1400 may also have input device(s) 1414 such as a touch screen (e.g., capacitive touch screen), keyboard, mouse, pen, voice input device, touch input device, remote control, camera, etc. Output device(s) 1416 such as a display (e.g., touch screen), speakers, etc. may also be included. All these devices are well known in the art and are not discussed at length.

In one embodiment, computer readable storage medium 1404 includes multimedia container module 1406, and operating system module 1450.

Multimedia container module 1406 comprises datastore access module 1420, image determination module 1422, display module 1424, selection module 1426, and multimedia container representation module 1430.

Datastore access module 1420 is operable to access a datastore corresponding to a multimedia container comprising a plurality of objects, wherein at least one object corresponds to a piece of content.

Image determination module 1422 operable to generate a plurality of respective images each corresponding to respective object of the plurality of objects of the multimedia container. Image determination module may be operable to periodically determine a respective image. In one embodiment, a first respective image corresponds to a first media type and a second respective image corresponds to a second media type.

Display module 1424 is operable to display each respective image of the plurality of respective images, where the display module is operable to display a portion of content adjacent to an application icon. In one embodiment, display module is operable for execution on a mobile device.

Selection module 1426 operable to receive a selection of the respective image and invoke an application corresponding to the image.

Multimedia container representation module 1430 comprises object access tracking module 1432, datastore access module 1434, recently accessed module 1436, image determination module 1438, and display module 1440.

Object access tracking module 1432 is operable to store usage information about a plurality of objects within a multimedia container into a datastore, where at least one object corresponds to a piece of content.

Datastore access module 1434 operable to access a datastore, as described herein.

Recently accessed module 1436 is operable to determine a plurality of most recently used objects of the multimedia container based on the usage information.

Image determination module 1438 is operable to generate a plurality of respective images, where each respective image corresponds to respective most recently used object.

Display module 1440 is operable to display an image comprising each respective image of the plurality of respective images, where the image corresponds to the multimedia container. In one embodiment, the image represents a minimization of the multimedia container. Selection of the image is operable for opening the multimedia container. In one exemplary embodiment, display module 1440 is operable to display a first respective image corresponding to a portion of content adjacent to a second respective image corresponding application icon. In one embodiment, display module 1440 is operable to display a first respective image corresponding to a most recently used object in a foreground relative to a second respective image corresponding to a second most recently used object.

Operating system module 1450 comprises datastore access module 1452, image determination module 1454, display module 1456, and selection module 1458.

Datastore access module 1452 is operable to access a datastore corresponding to a home multimedia container comprising a plurality of objects, where a first object of the plurality of objects is operable to be a piece of content.

Image determination module 1454 is operable to generate a plurality of respective images each corresponding to respective object of the plurality of objects of the home multimedia container. Display module 1456 is operable to display each respective image of the plurality of respective images, where the display module is operable to display a portion of content adjacent to an application icon. In one embodiment, a second object of the plurality of objects is operable to be an application.

Selection module 1458 is operable to receive a selection of the respective image and invoke an application corresponding to the image. In one embodiment, selection of a first respective image of the plurality of respective images is operable to launch an application for rendering a piece of content corresponding to the first respective image.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for displaying a graphical user interface on a mobile device, said method comprising:
  accessing a portion of an operating system operating on said mobile device;
  accessing a datastore corresponding to a home multimedia container at a root level of a hierarchy of multimedia containers stored in said mobile device, wherein said home multimedia container comprises a first object, a second object, a third object, and a plurality of subordinate multimedia containers in said hierarchy, wherein said first object is a first portion of content and said second object is an application, wherein said third object is a second portion of content of a different media type from said first object, and wherein said datastore comprises information about said first object, said second object, said third object and said plurality of subordinate multimedia containers;
  determining a first image based on said information about said first object;
  determining a second image based on an application icon corresponding to said application;
  displaying, within said home multimedia container, said first image, said second image, and overlapping images for each of the plurality of subordinate multimedia containers;
  in response to a user selection of said first image, launching a first application to render said first portion of content; and
  in response to a user selection of a first set of overlapping images of one of the plurality of subordinate multimedia containers, transforming the first set of overlapping images into a second set of images including non-overlapping images that each correspond to a respective image in the first set of overlapping images.

2. The method as described in claim 1, wherein said displaying is performed in response to performance of an unlock function.

3. The method as described in claim 1, wherein the first image is displayed adjacent to said second image.

4. The method as described in claim 1, wherein a user selection of said second image causes launching said application corresponding to said second image.

5. The method as described in claim 1, wherein the first object is a webpage, and wherein said first image is a scaled version of the webpage and is updated automatically.

6. The method as described in claim 1 further comprising, in response to a user operation of dragging said first image on top of said second image, generating a next-level multimedia container that comprises said first object and said second object.

7. The method as described in claim 1 further comprising removing said first object from said home multimedia container in response to a user operation of dragging said first image to a predetermined location within said graphical user interface.

8. The method as described in claim 1, further comprising, in response to the user selection of the first set of the overlapping images, displaying an exploded view of the second set of images.

9. A non-transitory computer-readable storage medium having stored thereon computer executable instructions that, if executed by a mobile computer system, cause the mobile computer system to perform a method for displaying a graphical user interface, said method comprising:
  accessing a portion of an operating system operating on said mobile computer system;
  accessing a datastore corresponding to a home multimedia container at a root level of a hierarchy of multimedia containers stored in said mobile computing system, wherein said home multimedia container comprises a first object, a second object, a third object, and a plurality of subordinate multimedia containers in said hierarchy, wherein said first object is a first portion of content and said second object is an application, wherein said third object is a second portion of content of a different media type from said first object, and wherein said datastore comprises information about said first object, said second object, said third object and said plurality of subordinate multimedia containers;

determining a first image based on said information about said first object;

determining a second image based on an application icon corresponding to said application;

displaying, within said home multimedia container, said first image, said second image, and overlapping images for each of the plurality of subordinate multimedia containers;

in response to a user selection of said first image, launching a first application to render said first portion of content; and in response to a user selection of a first set of overlapping images of one of the plurality of subordinate multimedia containers, transforming the first set of overlapping images into a second set of images including non-overlapping images that each correspond to a respective image in the first set of overlapping images.

10. The non-transitory computer-readable storage medium as described in claim 9, wherein said displaying is performed in response to performance of a security function of said operating system.

11. The non-transitory computer-readable storage medium as described in claim 9, wherein said displaying is performed as part of a startup sequence of said operating system.

12. The non-transitory computer-readable storage medium as described in claim 9, wherein said displaying is performed by said operating system.

13. The non-transitory computer-readable storage medium as described in claim 9, wherein said mobile computer system is a tablet computing device.

14. The non-transitory computer-readable storage medium as described in claim 9, wherein said method further comprises:

determining a third image based on said information in said datastore about said application; and displaying said third image, wherein a user interaction with said third image causes launching said application.

15. The non-transitory computer-readable storage medium as described in claim 9, wherein selection of said second image causes opening said multimedia container.

16. The non-transitory computer-readable storage medium as described in claim 9, wherein said first object is moved into said multimedia container in response to user selecting said first image and dragging said first image over said second image.

17. A mobile device configured to display a graphical user interface, said mobile device comprising:

a processor;

memory coupled to said processor and comprising instructions that, when executed by said processor, are configured to:

access a datastore corresponding to a home multimedia container at a root level of a hierarchy of multimedia containers, wherein said home multimedia container comprises a first object, and a second object, a third object, and a plurality of subordinate multimedia containers in said hierarchy, wherein said first object is a first portion of content and said second object is an application, wherein said third object is a second portion of content of a different media type from said first object, and wherein said datastore comprises information about said first object, said second object, said third object and said plurality of subordinate multimedia containers;

determine a first image based on said information about said first object;

determine a second image based on an application icon corresponding to said application;

display, within said home multimedia container, said first image, said second image, and overlapping images for each of the plurality of subordinate multimedia containers;

in response to a user selection of said first image, launch a first application to render said first portion of content; and in response to a user selection of a first set of overlapping images of one of the plurality of subordinate multimedia containers, transform the first set of overlapping images into a second set of images including non-overlapping images that each correspond to a respective image in the first set of overlapping images.

18. The mobile device as described in claim 17, wherein the instructions are further configured to receive a user selection of said second image and invoke the application corresponding to said second image.

19. The mobile device as described in claim 17 wherein said first image, said second image, and said overlapping images are displayed in response to performance of an unlock function.

* * * * *